United States Patent [19]

Daniels

[11] Patent Number: 5,749,533
[45] Date of Patent: May 12, 1998

[54] FISHING REEL WITH ELECTRONICALLY VARIABLE BRAKE FOR PREVENTING BACKLASH

[76] Inventor: John J. Daniels, 323 Roosevelt Dr., Seymour, Conn. 06483

[21] Appl. No.: 510,818

[22] Filed: Aug. 3, 1995

[51] Int. Cl.$^6$ .................................................. A01K 89/02
[52] U.S. Cl. .................. 242/287; 242/421.5; 242/422.2; 188/268
[58] Field of Search ...................... 242/287, 288, 242/286, 223, 421.5, 422.2, 302; 188/267, 268

[56] References Cited

U.S. PATENT DOCUMENTS

| | | | |
|---|---|---|---|
| 4,710,689 | 12/1987 | Uetsuki et al. | 242/288 X |
| 4,940,194 | 7/1990 | Young | 242/223 X |
| 5,248,113 | 9/1993 | Daniels | 242/288 X |
| 5,289,992 | 3/1994 | Du Plessis et al. | 242/287 |
| 5,417,314 | 5/1995 | Sproston et al. | 188/267 |
| 5,503,341 | 4/1996 | Kaneko et al. | 242/223 |
| 5,556,048 | 9/1996 | Hashimoto | 242/288 |

Primary Examiner—Daniel P. Stodola
Assistant Examiner—Emmanuel M. Marcelo
Attorney, Agent, or Firm—John J. Daniels

[57] ABSTRACT

An antibacklashing fishing reel having an electronically variable brake for preventing backlash. A spool holds and releases a length of fishing line. An electronically variable brake is coupled with the spool for applying a variable braking force to resist rotation of the spool during casting to prevent the spool from overrunning the length of fishing line being released from the spool. An overrun status of the length of fishing line being released from the spool is determined, and a status signal dependent thereon is generated. A controller receives the status signal and controls the electronically variable brake to apply the variable braking force to resist rotation of the spool during casting so that a progressively greater braking force is applied when the overrun status indicates that the spool is overrunning the length of fishing line being released. The progressively greater braking force is applied until the overrun status indicated that the spool is not overrunning the length of fishing line, thus preventing the spool from overrunning the length of fishing line being released from the spool during casting.

20 Claims, 24 Drawing Sheets

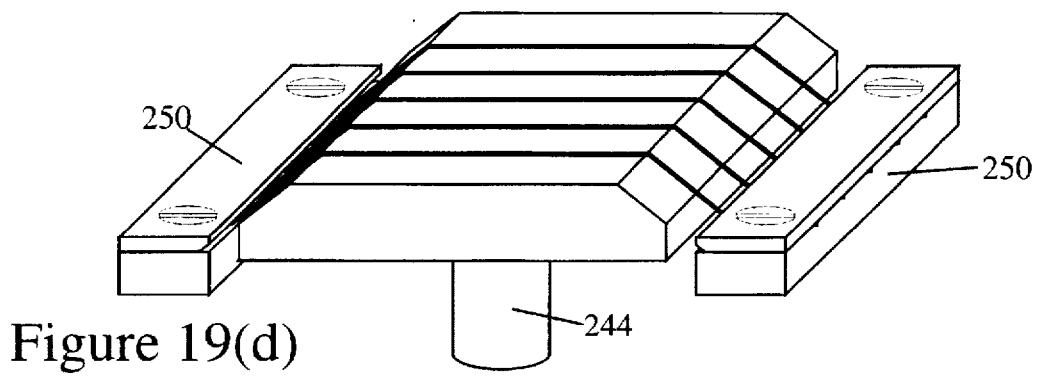
Figure 19(d)
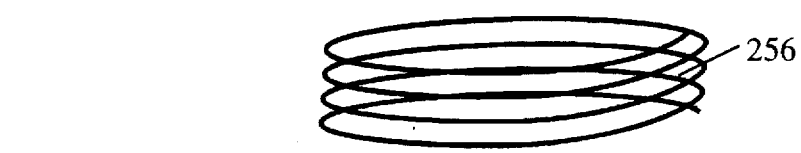
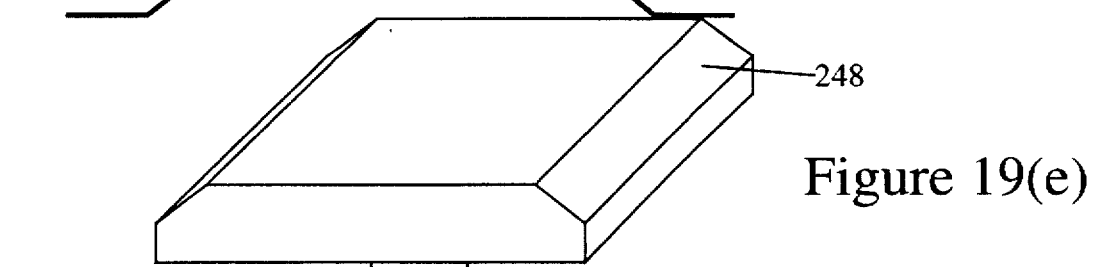
Figure 19(e)
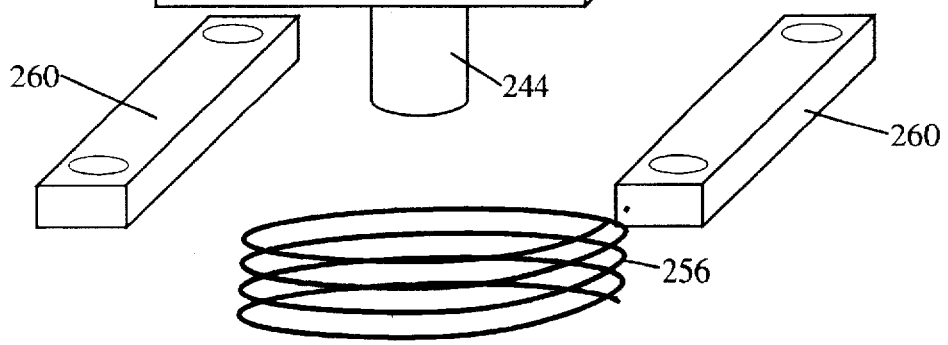

FISHING REEL WITH ELECTRONICALLY VARIABLE BRAKE FOR PREVENTING BACKLASH

BACKGROUND OF THE INVENTION

The present invention pertains to a tension responsive fishing reel having an anti-backlashing device. More particularly, the present invention pertains a fishing reel using a dynamic braking system for providing a controllable variable drag resistance to control the unwinding of the fishing line from the fishing reel. The invention also pertains to an anti-backlashing device utilizing a variable braking device to precisely control rotation of the spool of the reel during casting to prevent overrun or backlashing.

A type of conventional fishing reel, known as a bait casting reel, has a horizontally disposed spool rotatably supported during casting to allow fishing line wound on the spool to be played out during the cast. The spool is then rotatably driven by a crank shaft to retrieve the played out fishing line back onto the spool. Another type of fishing reel, known as a spinning reel, has a vertically mounted spool that remains stationary during a cast. The fishing line is played out over the top edge of the vertically mounted spool. The line is retrieved by cranking a bail around the spool to wind the line thereon. Bait casting reels have many advantages over spinning reels. For example, under equal circumstances, a bait casting reel is capable of longer casting distances than a spin casting reel. This is primarily due to the freedom by which the fishing line is played out from the spool, since the spool is rotationally supported.

To maximize the casting distance using a bait casting reel the resistance to rotation of the spool must be minimized as much as possible. A very common problem which often occurs when using a bait casting reel is that the spool rotates faster at some point during the cast when the line is being played out from it, causing the line to wrap itself back under the spool resulting in what is called backlashing, overrun or bird nesting. This backlashing phenomenon has seriously limited the use of the bait casting reel, and it is used mostly by those who have taken the time and effort to master the subtle technique necessary to overcome the tendency of the spool to backlash.

Preventing backlashing of the bait casting spool is done by a method known as "thumbing" the spool. A light and precisely controlled thumb pressure is exerted on the wound line on the spool during the cast as the spool rotates and the line is played out. The pressure exerted by the thumb, and thus the resistance to rotation of the spool, must be very precisely controlled to enable a long distance cast while preventing the backlashing phenomenon. However, the maximization of the advantages of the bait casting reel has eluded all but a few who have mastered this technique. Therefore, the typical use of a bait casting reel results in much frustration and lost fishing time caused by the entangled bird nest of line resulting from the backlashing.

In an attempt to alleviate the effects of backlashing, centrifugal and magnetic brakes have been employed to slow down the acceleration or speed of the rotating spool. However, the centrifugal brakes are applied without regard to the relative speed of the line being played out relative to the spool's rotation, and usually either reduce the obtainable casting distance by applying too much of a braking force, or are ineffective at reducing the spool's rotation at the proper time to prevent backlashing. An example of a centrifugal brake mechanism for a fishing reel is disclosed in U.S. Pat. No. 5,308,021, issued to Ikuta.

FIG. 20(a) shows the components of a conventional bait casting reel. The conventional bait casting reel includes a spool 1 for holding and releasing fishing line 2. The spool is supported on a shaft 3, such as by rotational bearings disposed in the interior of the spool 1. A manual casting drag adjustment knob 4 is used to adjust a friction force applied to resist rotation of the spool 1 during casting. The manual casting drag adjustment knob 4 is set at a selected level prior to casting and generally remains at this selected level during the entire cast. Stated otherwise, whatever level of drag is selected using the manual drag adjusting knob 4 prior to casting remains as a drag against rotation of the spool during the entire cast. Thus, conventionally anglers have had to tread a delicate balance between too much casting drag resulting in shorter casting distances, and too little casting drag resulting in an increased tendency of backlashing. A manual fighting drag adjustment wheel 5 is used to adjust the frictional force applied to the crank gear 6, which in turn acts as a braking force against the rotation of the spool when reeling in a hooked fish. As shown in FIG. 20(b), during a casting operation the fishing line is pulled from the spool by a projected lure or weight, causing the spool to rotate as the fishing line is released. When the fishing line and projected lure are traveling at a slower speed than the rotating spool is allowing the fishing line to be released, the outer wrapped strands of the fishing line expand off the spool until a bird nesting phenomenon occurs. During the bird nesting phenomenon, the overrun of the spool causes the strands to become entangled, thus preventing the line from being released from the spool.

FIGS. 21(a)–21(f) show the internal components of a conventional reel. FIG. 21(a) shows the cranking and fighting drag components assembled, and FIG. 21(b) show the components in an exploded view. The components include a frame 7 on which is supported a frame mount 8. A spring member 9 is disposed on the frame mount and urges against the base of a crank shaft 10 also mounted on the frame mount 8. A line-guide gear 11 is mounted on the crank shaft 10 and is used to drive a line-guide 12 (shown in FIG. 20(b)) of the fishing reel in a reciprocating manner so that the line is retrieved evenly on the spool 1. The crank gear 6 is mounted on the crank shaft 10 followed by a number of friction disks 13. A sleeve 14 is mounted on the crank shaft 10 followed by a pair of spring elements 15. The fighting drag is adjusted by turning a fighting drag adjustment wheel which has a threaded central portion that is mated with a threaded portion of the crank shaft 10. By turning the wheel, an increasing or decreasing contact pressure is placed on the friction elements (disk 13) of the fighting drag, thereby creating more or less resistance to the rotation of the crank gear 6.

The crank handle 15 is mounted on the crank shaft 10, and is used to rotate the crank gear 6. A nut 16 and slip ring 17 attach the crank handle and other components together.

FIGS. 21(c) and 21(d) show the elements of a conventional spool and casting drag brake, as well as the spool engagement mechanism 18 used to engage and disengage the crank gear 6 from the spool gear 19 during times of casting (disengagement) and reeling (engagement). As shown in FIG. 21(e), during periods of engagement, the engagement portion fixed with the spool gear 19 is urged into contact with engagement posts 21 on the face of the spool (FIG. 21(f)). To adjust the casting drag, an urging member 22 on the spool shaft 3 is urged against a contacting surface 23 of the spool face (FIG. 21(f)) causing a friction surface 24 on the opposite spool face to come into greater or lesser contact pressure with a friction surface on the reel housing (not shown).

There have been prior attempts at preventing the unwanted backlashing of a spool of a fishing reel during casting. U.S. Pat. No. 4,196,871, issued to Kobayashi, describes the use of a mechanical spool brake having a spring biased pivotally mounted brake lever bearing a frictional brake shoe against an inner surface of a reel spool flange. When an unwinding fishing line is under tension, a roller is lifted by the fishing line, releasing the spool brake against the force of the biasing spring. When the line tension is reduced, the spool brake is re-engaged by the force of the biasing spring in an attempt to prevent backlashing. However, this prior device relies on a relatively inadequate, complicated, and delicate mechanical braking system, and lacks the subtle controllability necessary to effectively prevent backlashing. U.S. Pat. No. 4,733,831, issued to Runyon, utilizes a sleeve attachment that is positioned on a bait casing reel line spool after a quantity of line has been released from the spool during a cast. The released line is then wound on the spool over the sleeve attachment. The sleeve attachment lightly frictionally grips the outer convolutions of fishing line on the bait casting reel line spool to prevent backlash of the line left on the reel beneath the attachment during subsequent casting operations. This prior attempt, has limited effectiveness, does not prevent backlash of the fishing line being released from the spool and requires the complicated attachment and removal of the sleeve attachment for use. Also, the distance obtainable by a subsequent cast is limited due to the presence of the sleeve attachment.

My prior U.S. Pat. Nos. 5,195,267, issued Mar. 23, 1993 and 5,248,113, issued Sep. 28, 1993, both of which are incorporated by reference herein, teach a tension responsive fishing reel that varies a resistance applied to a bobbin member to control the release of fishing line. A friction plate surrounded by a variable viscosity fluid, such as an electrical Theological fluid, or a magnetic-powder dispersed fluid is rotated by the spool, and by controlling a field applied to the variable viscosity fluid, the rotation of the spool is braked.

Figure 17A:
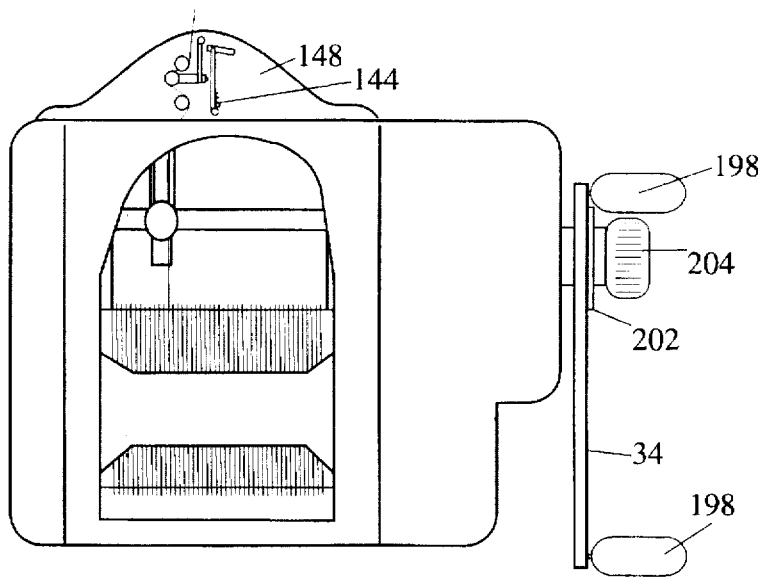
Figure 17B:
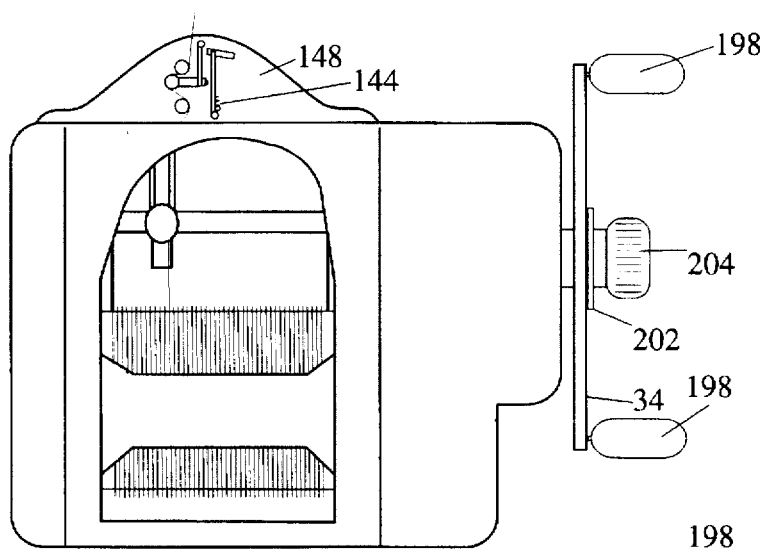
Figure 17C:
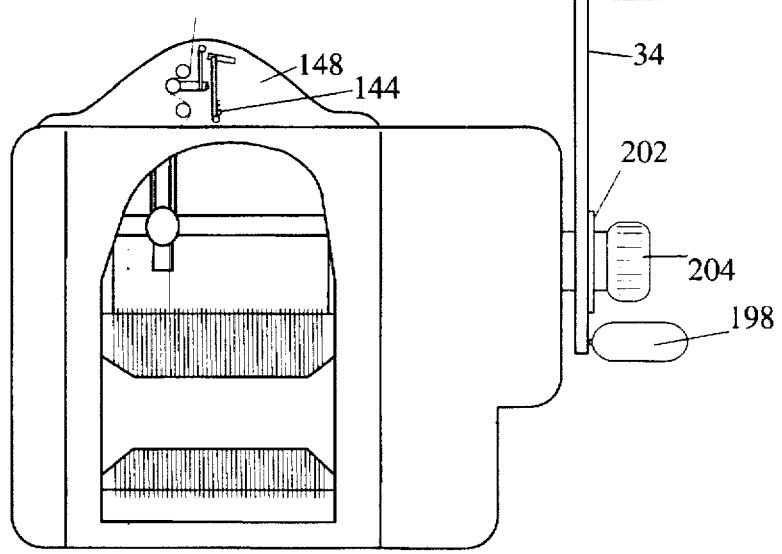
Figure 18A:
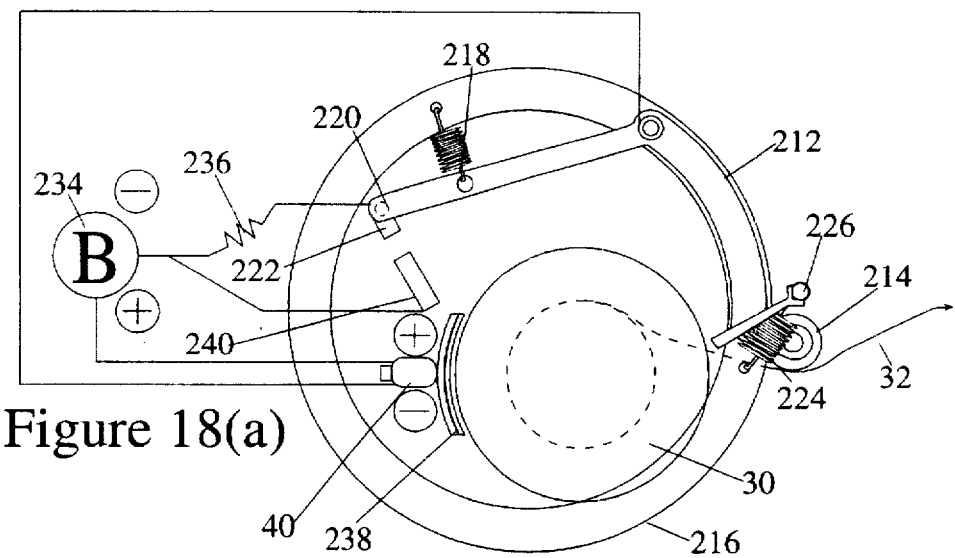
Figure 18B:
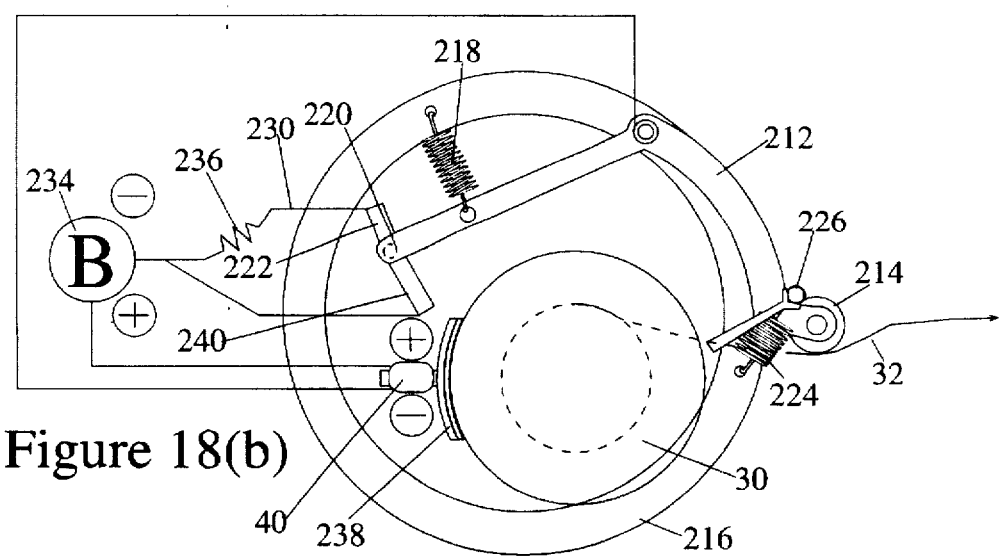
Figure 18C:
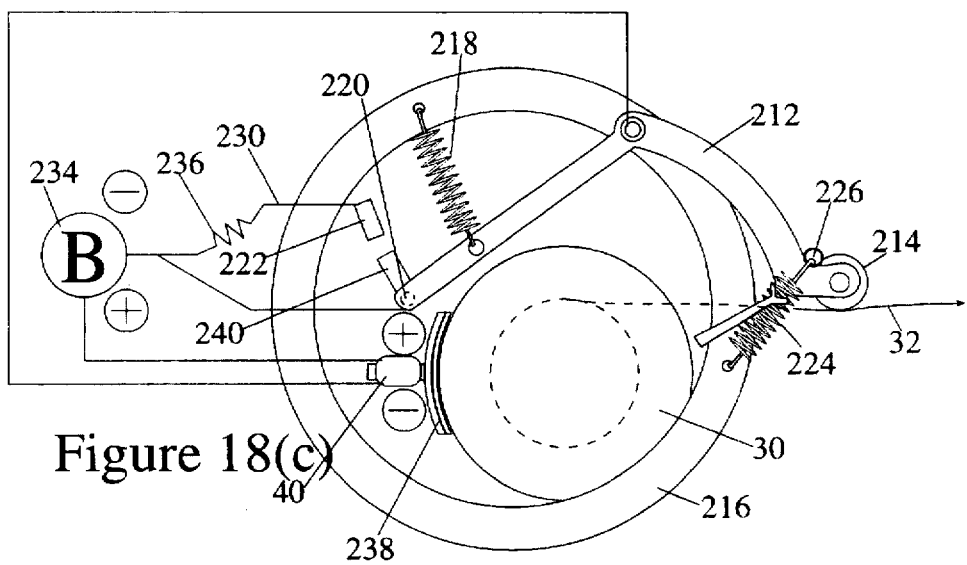
Figure 19A:
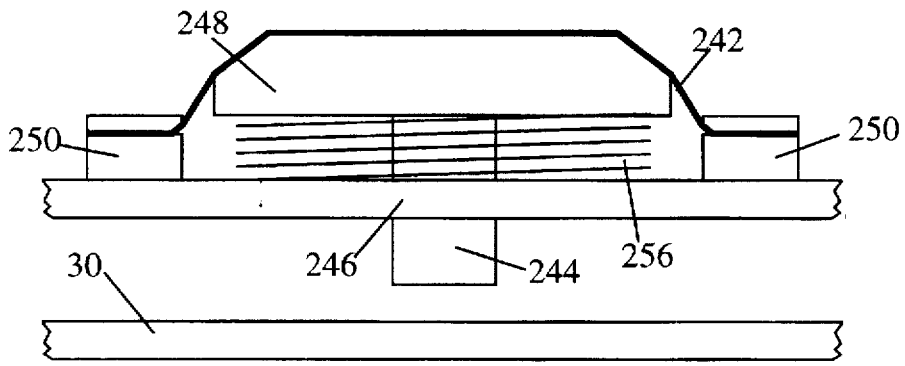
Figure 19B:
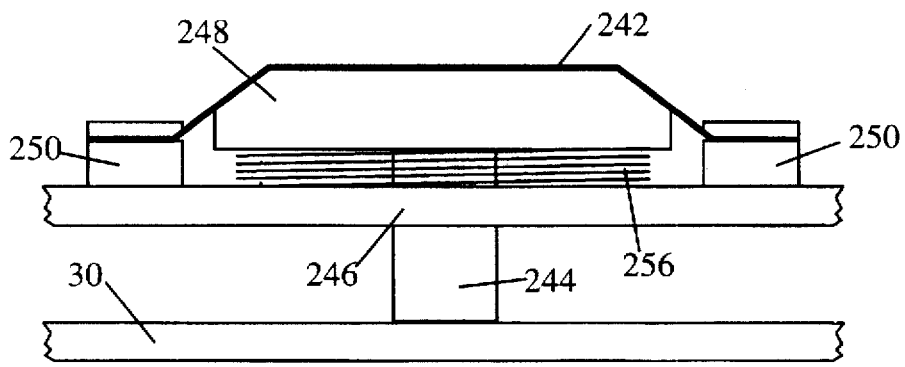
Figure 19C:
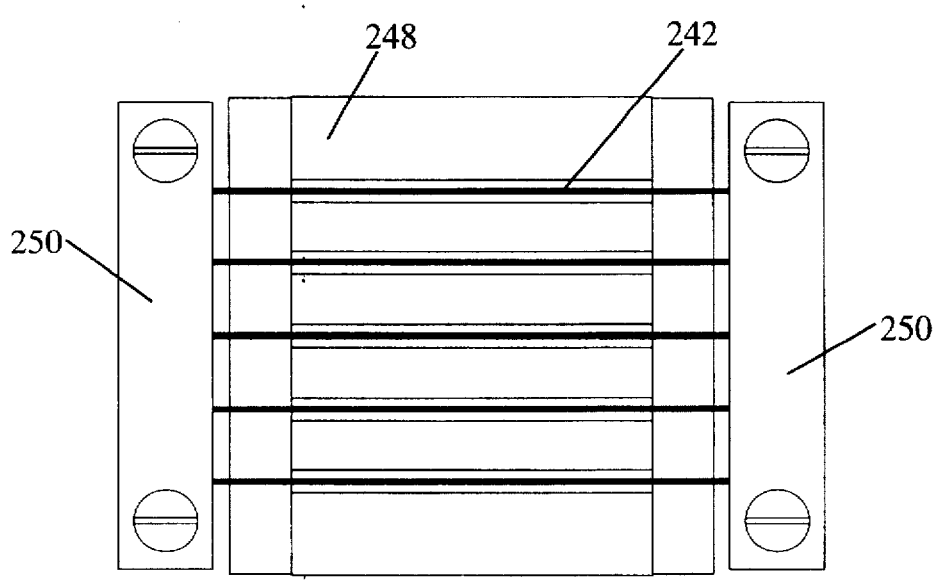
Figure 19F:
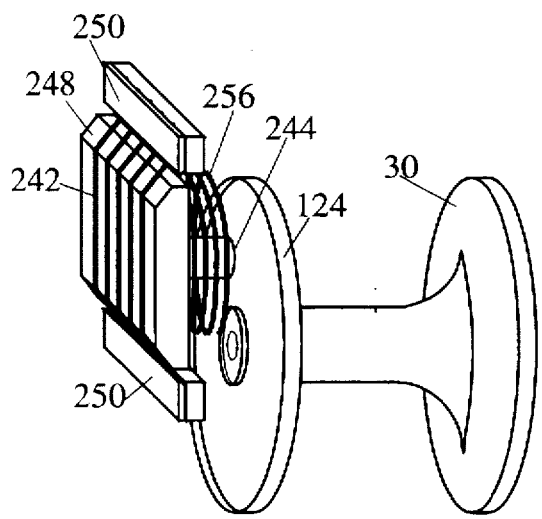
Figure 19G:
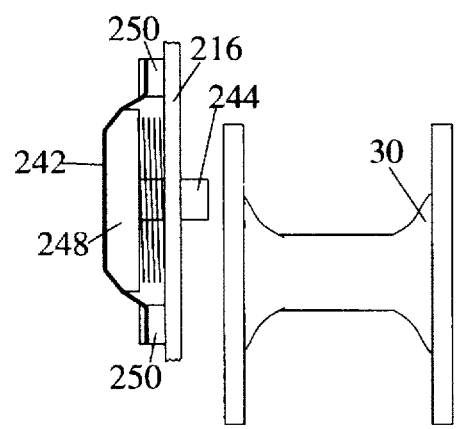
Figure 19H:
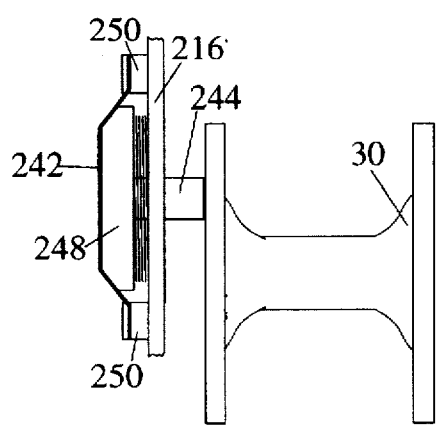
Figure 20:
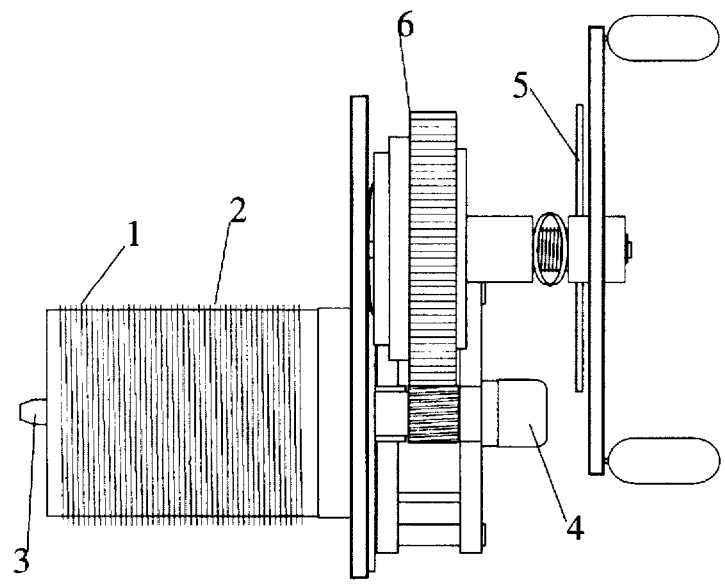
Figure 20:
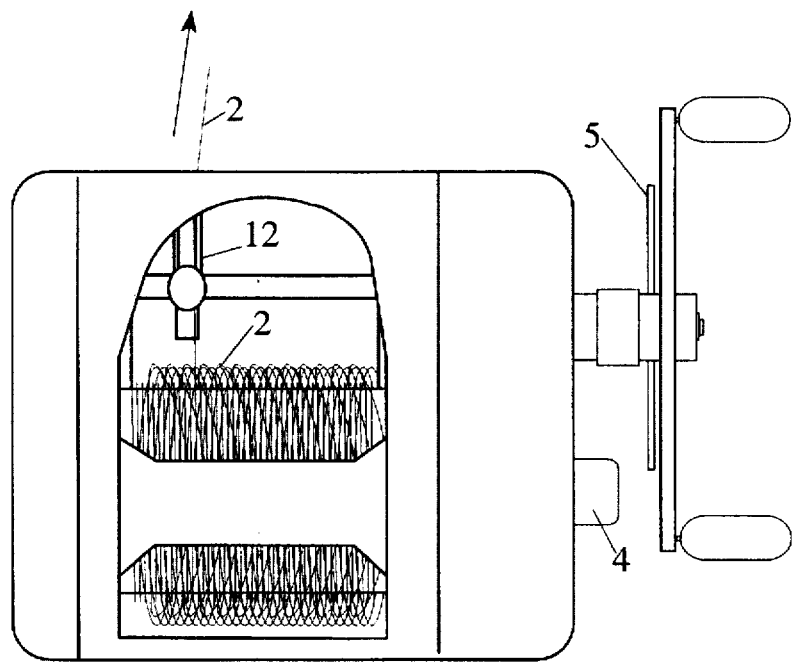
Figure 21A:
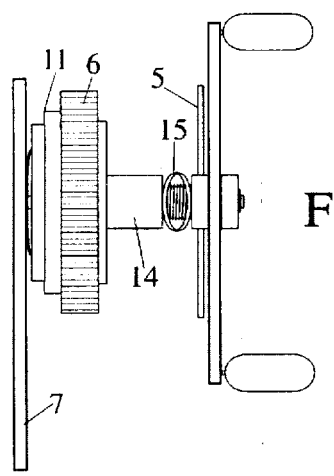
Figure 21B:
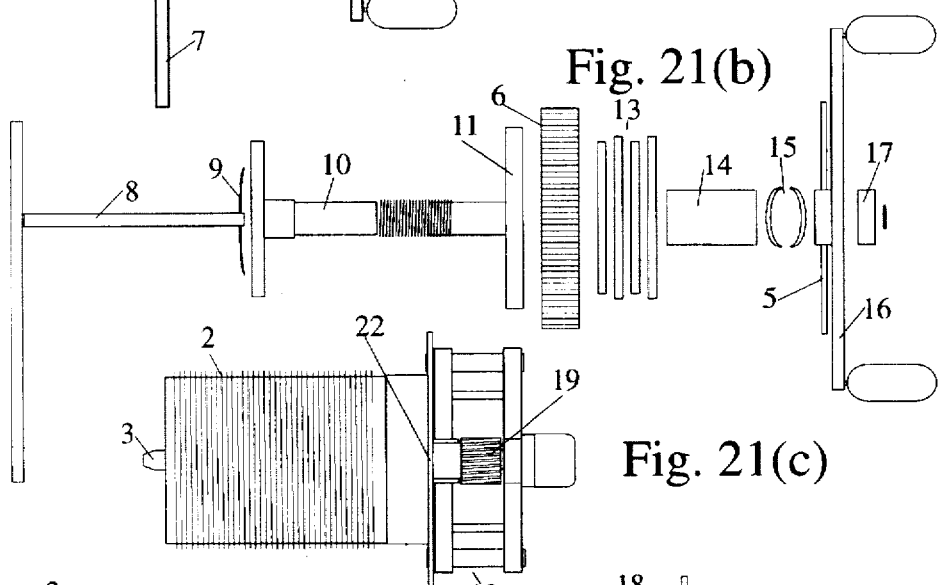
Figure 21C:
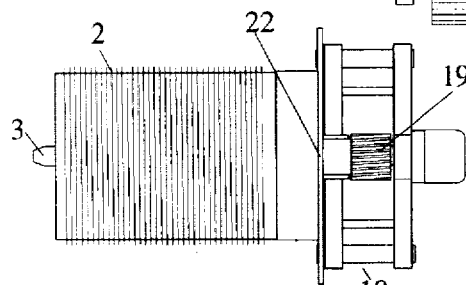
Figure 21D:
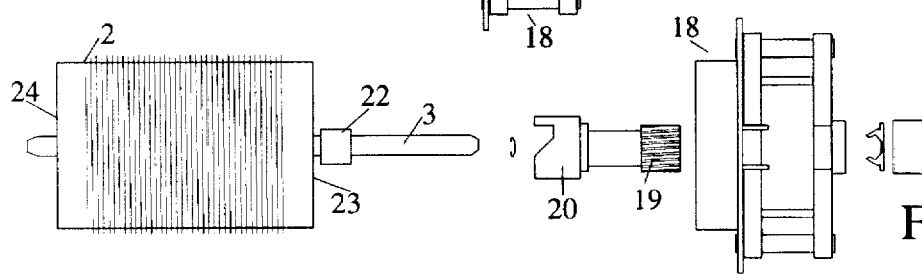
Figure 21E:
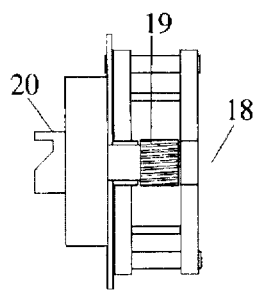
Figure 21F:
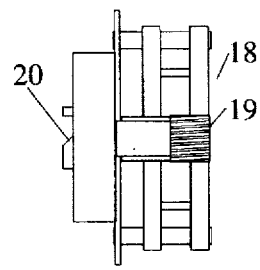
Figure 21G:
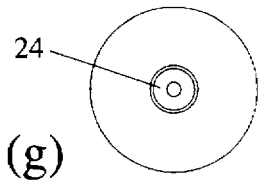
Figures 21H, 21I:
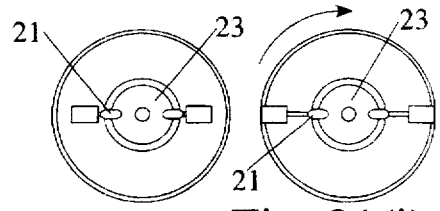
Figure 22:
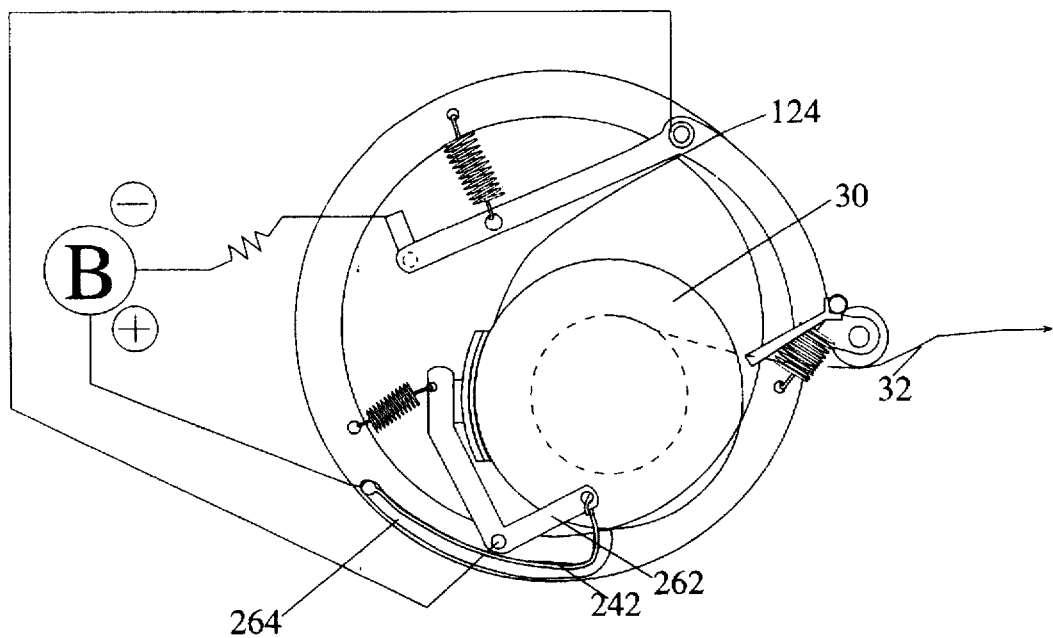
Figure 23A:
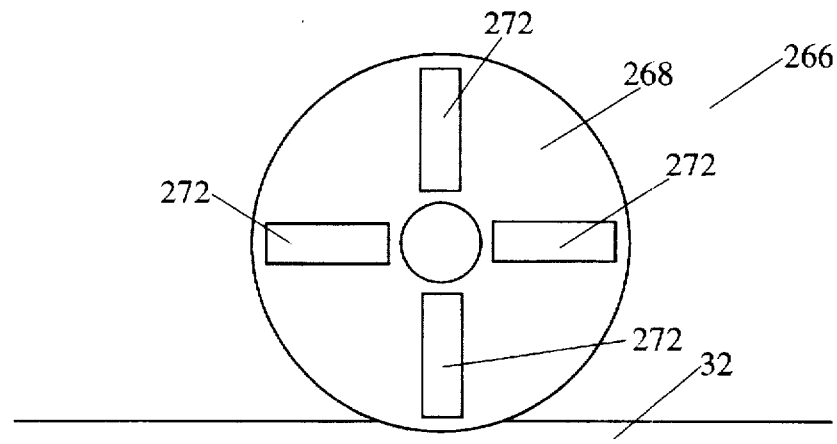
Figures 23B, 23C, 23D:
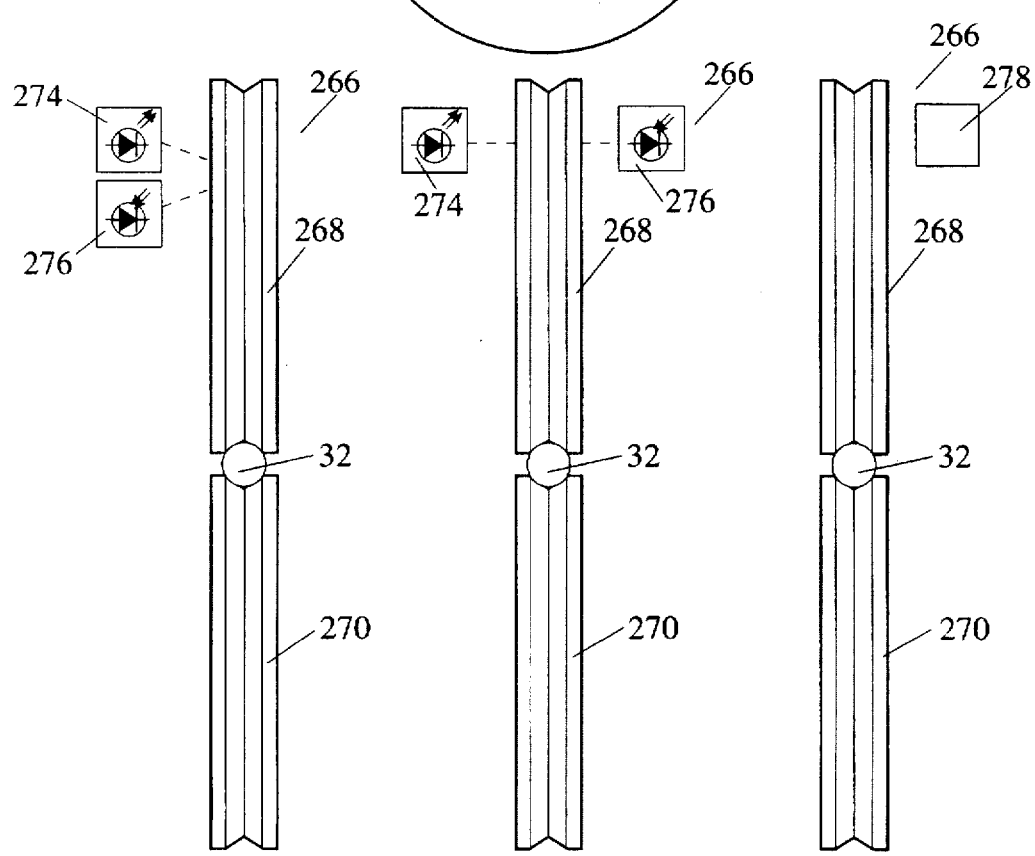

17(a) is a top plan view of an embodiment of the inventive bait casting reel having the cranking speed adjustment mechanism;

FIG. 17(b) is a top plan view of the embodiment of the inventive bait casting reel shown in FIG. 17(a) having the cranking speed handle disposed at another position;

FIG. 17(c) is a top plan view of the embodiment of the inventive bait casting reel shown in FIG. 17(a) having the cranking speed handle disposed at yet another position;

FIG. 18(a) is a schematic side view of another alternative embodiment of the inventive tension sensor;

FIG. 18(b) is a schematic side view of the embodiment of the inventive tension sensor shown in FIG. 18(a) during a casting operation;

FIG. 18(c) is a schematic side view of the embodiment of the inventive tension sensor shown in FIG. 18(a) during a fish fighting operation;

FIG. 19(a) is an enlarged partially cutaway side view of an embodiment of the inventive spool brake;

FIG. 19(b) is a partially cutaway side view of the embodiment of the inventive spool brake shown in FIG. 19(a) applying a braking force to the spool;

FIG. 19(c) is a top plan view of the embodiment of the inventive spool brake shown in FIG. 19(a);

FIG. 19(d) is an assembled perspective view of the inventive spool brake shown in FIG. 19(a);

FIG. 19(e) is an exploded perspective view of the inventive spool brake shown in FIG. 19(a);

FIG. 19(f) is a perspective view of the inventive spool brake shown in FIG. 19(a), shown oriented and disposed in use adjacent to the spool;

FIG. 19(g) is a side view of the inventive spool brake shown in FIG. 19(a), shown oriented and disposed in use adjacent to the spool;

FIG. 19(h) is a side view of the inventive spool brake shown in FIG. 19(a), shown oriented and disposed adjacent to the spool and applying a braking force to the spool;

FIG. 20(a) is a view of the components of a conventional bait casting fishing reel;

FIG. 20(b) is a view of a conventional bait casting fishing reel;

FIG. 21(a) is an assembled view of a conventional fighting drag of a conventional bait casting fishing reel;

FIG. 21(b) is an exploded view of a convention fighting drag of a conventional bait casting fishing reel;

FIG. 21(c) is an assembled view of a conventional casting drag of a conventional bait casting fishing reel;

FIG. 21(d) is an exploded view of a conventional casting drag of a conventional bait casting fishing reel;

FIG. 21(e) is a side view of a spool engagement mechanism of a conventional bait casting fishing reel;

FIG. 21(f) is a side view of a spool engagement mechanism of a conventional bait casting fishing reel;

FIG. 21(g) is an end view of a spool of a conventional bait casting fishing reel;

FIG. 21(h) is an end view of a spool of a conventional bait casting fishing reel;

FIG. 21(i) is an end view of a spool of a conventional bait casting fishing reel;

FIG. 22 is a schematic view of an alternative configuration of the inventive bait casting fishing reel;

FIG. 23(a) is an isolated enlarged side view of an inventive line motion sensor;

FIG. 23(b) is an isolated enlarged side view of the inventive line motion sensor shown in FIG. 23(a) having photo-detecting means FIG. 23(c) is an isolated enlarged side view of the inventive line motion sensor shown in FIG. 23(a) having photo-detecting means; and FIG. 23(d) is an isolated enlarged side view of the inventive line motion sensor shown in FIG. 23(a) having magnetic detecting means.

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1A:
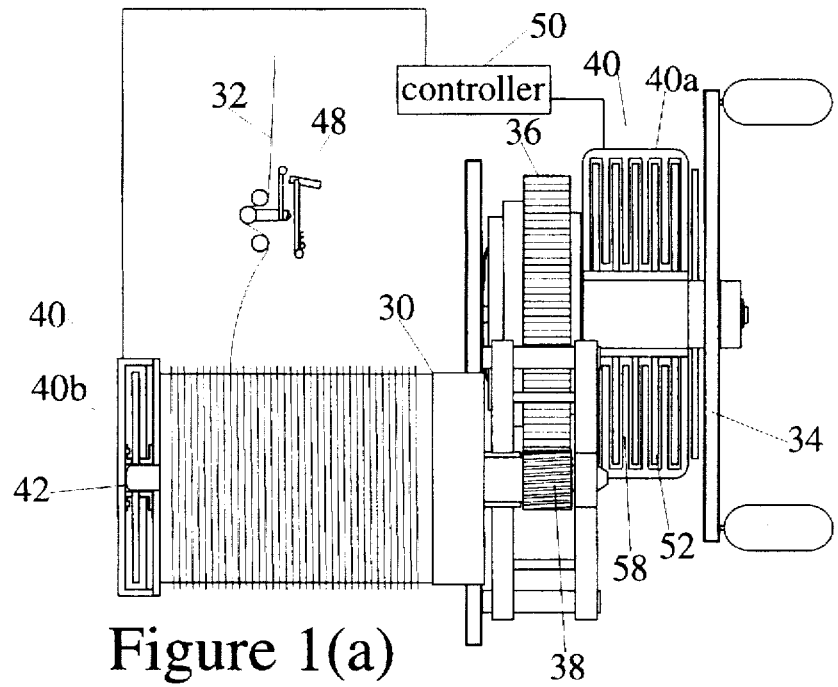
FIG. 1(a) is a view of the components of a bait casting fishing reel in accordance with the present invention.

Referring to FIG. 1(a), in accordance with the present invention, an anti-backlashing bait casting fishing reel is provided. A spool 30 holds and releases a length of fishing line 32. The fishing line 32 is wound around the spool 30 by rotating a crank handle 34, which in turn rotates a crank gear 36, which is coupled with a spool gear 38, which in turn rotates the spool 30. As the spool 30 is rotated in a retrieving direction, the fishing line 32 that had been released from the spool 30 (during a just previous cast) is retrieved and wound on the spool 30. An electronically variable brake 40 is coupled with the spool 30 for applying a variable braking force to resist rotation of the spool 30. As shown in FIG. 1(a), two electronically variable brakes 40 may be provided, one being a fighting drag brake 40a associated with the crank gear 36 and coupled to the spool 30 through the crank gear 36 and spool gear 38, and a casting drag brake 40b, which, as shown, may be directly coupled with the spool 30. The casting drag brake 40b may, alternatively, be coupled with the spool 30 through an appropriate gearing mechanism, or other coupling means, such as a spool 30 shaft rotated with the spool 30, etc. Various configurations of the casting drag brake are disclosed herein. The electronically variable brake 40 (casting drag brake 40b) is coupled with the spool 30 for applying a variable braking force to resist rotation of the spool 30 during casting to prevent the spool 30 from overrunning the length of fishing line 32 being released from the spool 30. The casting drag brake 40b is applied at varying strengths during different times of the cast so that the rotation of the spool 30 is appropriately slowed.

The high degree of braking precision afforded by the use of an electronically variable brake 40 allows for optimum braking force to be applied to the spool 30, so that resistance is not applied at times when the spool 30 should be rotating freely (i.e., when during a cast the line is being released or played out from the spool 30 at the same rate that the spool 30 is rotating). On the other hand, a correct proportional amount of braking force is applied to slow the rotation of the spool 30 when needed (such as during times when the line is being played out or released from the spool 30 at a rate slower than the spool 30 is rotating causing an overrun or birds nesting situation).

Figure 1B:
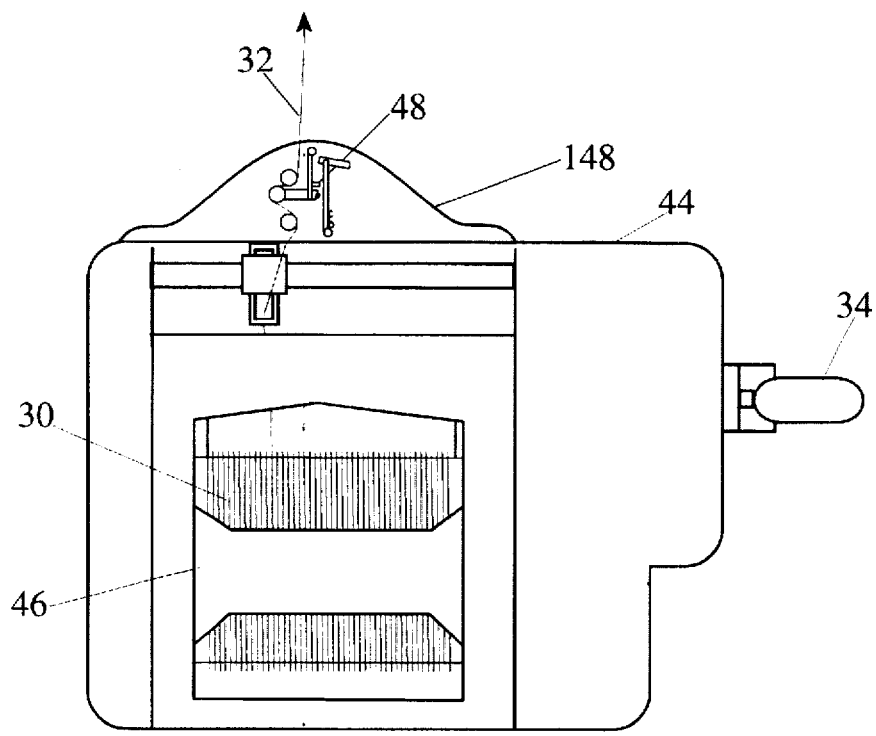
FIG. 1(b) is an external view of the bait casting fishing reel shown in FIG. 1(a)

FIG. 1(b) shows an embodiment of the inventive fishing reel in which the casting drag brake 40b, spool 30, fighting drag brake 40a, and cranking components are contained within a cover 44. Just prior to casting, a casting release lever 46 is depressed to disengage the crank gear 36 from the spool gear 38 in a conventional manner.

Conventionally, after the casting release lever 46 is depressed the spool 30 is free-wheeling and the release of the line from the spool 30 is controlled by the user pressing his thumb against the line wrapped on the spool 30 to apply a user-applied braking force against the rotation of the spool 30 and the release of the line. At the appropriate time in the casting operation, the user releases his thumb from the spool 30, allowing the line to be played out, as it is pulled forward by the momentum of the lure or sinker being cast. In accordance with the present invention, after the casting lever 192 is depressed, a braking force against the rotation of the spool 30 is automatically applied by the casting drag brake 40b to prevent the line from being released at an undesired moment. The user still presses his thumb against the spool 30 to control the release of the line during the initial casting operation. Once the thumb pressure is released, the lure or sinker is projected forward by the casting operation, and the line is released and played out from the spool 30. In accordance with the present invention, determining means 48, which may be a tension sensor 144 or a position sensor as described below, determines an overrun status of the length of fishing line 32 being released from the spool 30. The determining means 48 generates a status signal dependent thereon, which is received by a controller 50 (as shown, for example, in FIG. 11(b)). The electronically variable brake 40 is controlled by the controller 50 to apply a variable braking force to resist the rotation of the spool 30 during casting so that a progressively greater braking force is applied when the overrun status indicates that the spool 30 is overrunning the length of fishing line 32 being released. The progressively greater braking strength is applied until the determined overrun status indicates that the spool 30 is not overrunning the length of fishing line 32, so as to prevent the spool 30 from overrunning the length of fishing line 32 being released from the spool 30 during casting.

Figure 2A:
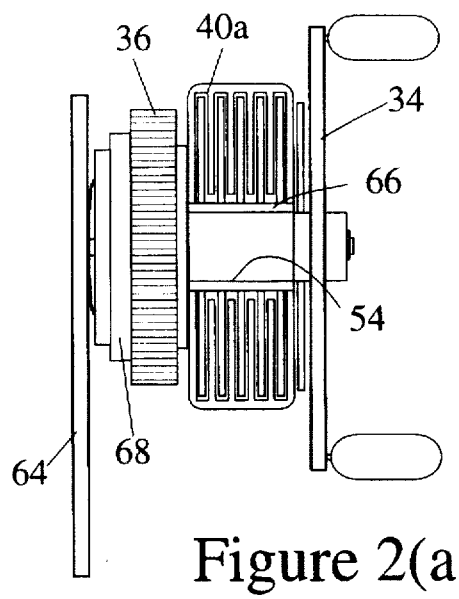
FIG. 2(a) is a view of assembled fighting drag components in accordance with the inventive bait casting fishing reel.
Figure 2B:
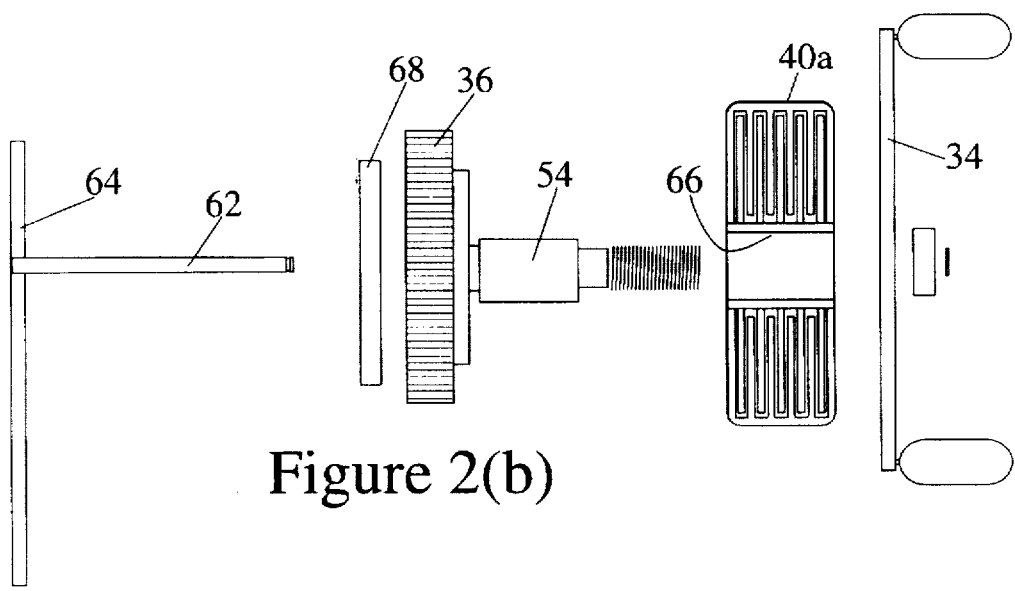
FIG. 2(b) is an exploded view of the fighting drag components shown in FIG. 2(a)

FIGS. 2(a) and 2(b) show isolated views of the fighting drag brake 40a and cranking components in accordance with the present invention. Various embodiments of electrical rheological (ER) fluid and magnetic rheological (MR) fluid resistance devices, along with a detailed description of the mechanics of an ER fluid and an MR fluid can be found in applicant's co-pending U.S. patent application Ser. No. 240,884, filed May 10, 1994, which is incorporated by reference herein. These resistance devices may be used for providing an electrically variable braking device for controlling the rotation of the spool. In this embodiment, the fighting drag brake 40a comprises an ER brake including a plurality of rotating electrodes 52 (shown, for example, in FIG. 4(a)) that are rotated by the crank gear 36 via a one-way clutch mechanism 54. The rotating electrodes 52 are surrounded by a variable viscosity material (ER fluid 56, MR fluid, SSP), such as an ER or MR fluid. In the case of the ER fluid brake shown, the rotating electrodes 52 are sandwiched between respective stationary electrodes 58 with an ER fluid 56 disposed in the gap between the stationary and rotating electrodes 52. When an electrical field is applied to the electrodes, the ER fluid 56 reacts by progressively gelling in proportion to the voltage applied to the electrodes. In accordance with the present invention, by varying the voltage applied to the electrodes, the resistance to the rotation of the crank gear 36 is selectively controlled so that, when the crank gear 36 is engaged with the spool gear 38, a braking force is applied to the spool 30 from the fighting drag brake 40a. In the case of an MR fluid, the rotating electrodes 52 are replaced by rotating plates 92 (which may or may not conduct electricity), and a variable magnetic field is applied through the use of an electromagnetic coil 96. The fighting drag brake 40a may alternatively comprise any of the configurations described herein for the casting drag brake 40b; however, generally, the fighting drag brake 40a will be required to provide more braking potential, since it is used to combat the efforts of a hooked fish. In contrast, the casting drag brake 40b is not used to resist the efforts of a hooked fish, but rather is used to controllably apply a variable braking force to slow the rotation of the spool 30 during casting. Also, the casting drag brake 40b may supplement the fighting drag brake 40a when fighting a hooked fish, to apply a maximum braking force against the rotation of the spool 30. The various cranking components are assembled on a frame mount 62 supported by a frame 64 which is fixed in place to the body of the reel. In this configuration, the fighting drag brake 40a has a hollow shaft 66 which accepts a one-way clutch mechanism 54.

The crank gear 36 is rotated by the one-way clutch mechanism 54 that couples the crank gear 36 to the fighting drag brake 40a, and is also driven by the crank handle 34 via the one-way clutch mechanism 54 during retrieval of the line onto the spool 30. A line guide gear 68 is rotated with the crank gear 36, as in a conventional reel, for reciprocating a line guide 70 back and forth to evenly dispose the fishing line 32 onto the rotating spool 30 (shown in FIG. 1(b)).

Figure 3A:
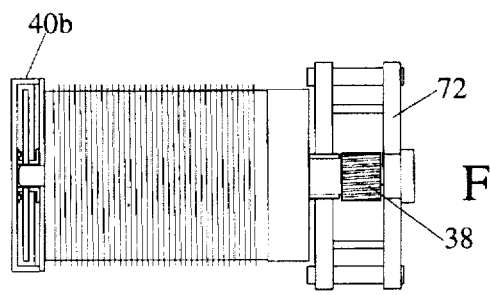
FIG. 3(a) is a view of assembled casting drag components in accordance with the inventive bait casting fishing reel.
Figure 3B:
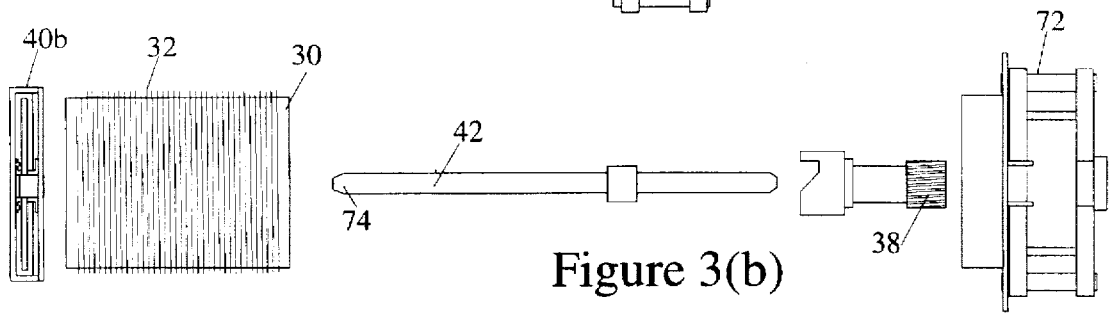
FIG. 3(b) is an exploded view of the casting drag components shown in FIG. 3(a)

FIGS. 3(a) and 3(b) show an assembled and exploded view, respectively, of the spool 30, spool engaging mechanism 72, and casting drag brake 40b in accordance with the present invention. The spool engaging mechanism 72 utilizes a construction similar to that of a conventional reel, and its detailed description is omitted.

The function of the spool engaging mechanism 72 is to selectively engage the spool gear 38 with the crank gear 36 during retrieval of the line back onto the spool 30, and when fighting a fish. The spool engaging mechanism 72 is operable by the casting release lever 46 (shown in FIG. 1(b)) to disengage the spool gear 38 from the crank gear 36, so that during casting the spool 30 rotates without any resistance due to the fighting drag brake 40a and cranking components. As shown schematically, the spool 30 is coupled with the casting drag brake 40b, so that in this configuration, the rotation of the spool 30 causes the rotating electrode 52 to rotate. The spool 30 may be coupled with the rotating electrode 52 through any suitable mechanism such as a gearbox, interconnecting shafts or other gearing or coupling mechanism. In the configuration shown, the spool 30 rotates freely on a spool shaft 42 and is coupled with a hollow shaft 66 of the rotating electrode 52 via a coupling protrusion 74 integrally fixed with the spool 30. The coupling protrusion 74 has an appropriate shape to engage with and mate with a hollow shaft 66 of the rotating electrode 52. Thus, rotation of the spool 30 is coupled with rotation of the rotating electrode 52.

Figure 3C:
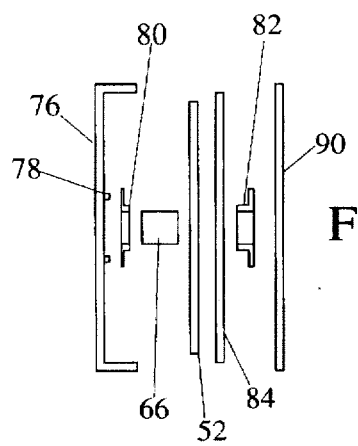
FIG. 3(c) is an exploded view of an embodiment of the inventive casting drag brake.

As shown in FIG. 3(c), this configuration of the casting drag brake 40b comprises an ER fluid brake. The ER fluid brake has a housing body 76 which supports mounting posts 78. The mounting posts 78 engage with a first shaft support 80 and hold the first shaft support 80 in place on the housing body 76. The hollow shaft 66 of the rotating electrode 52 is rotatably supported at one end by the first shaft support 80. At the other end, the hollow shaft 66 is rotatably supported by a second shaft support 82. The second shaft support 82 passes through a housing cover 84 which acts with the housing body 76 to define an interior space for containing the rotating electrode 52 and surrounding ER fluid 56. The interior walls of the housing body 76 and the housing cover 84 are electrically conductive and act with the rotating electrode 52 to apply a variable electric field to the ER fluid 56 contained therebetween. By varying the electric field applied to the ER fluid 56, a variable braking force is applied to resist the rotation of the spool 30. The rotating electrode 52, the housing body 76 and the housing cover 84 are applied with electric potential via leads (not shown) supplied with electricity from a variable power source 158 (shown, for example, in FIGS. 11 (a) and 11 (b)). The leads attached to the rotating electrode 52 spool 30 must accommodate the rotation of the electrode, such as through the use of an electrically conductive brush, or other sliding electrode arrangement.

Figure 3D:
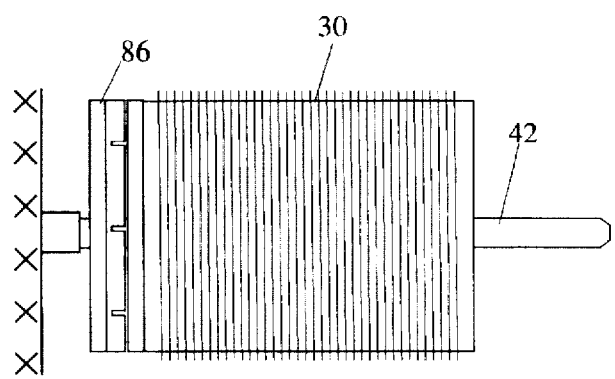
FIG. 3(d) is a view of an embodiment of the inventive casting drag and spool having a piezon-electric casting drag brake.

As shown in FIG. 3(d), an alternative casting drag brake 40b utilizes a piezo electric motor 86 to apply a counter rotating braking force to the rotation of the spool 30. A piezo electric or ultrasonic motor is a vibration wave motor that transduces a vibration caused by an application of a period voltage to an electro-strain element to a rotational motion. Since it does not require any conductive winding (required in a conventional motor) it is simple in structure and compact in size, provides a high torque at a low rotating speed and has a small inertial rotation. A piezo electric or ultrasonic motor having an appropriate maximum rotational driving force, or torque, may be used as the casting drag brake 40b thereby providing a compact, inexpensive and easy to manufacture variable brake effective for controlling the rotation of the spool 30 of a bait casting reel so that the overrun, or bird nesting phenomenon, is prevented. By applying a counter rotating torque relative to the rotation of the spool 30, the use of a motor is able to apply an effective, highly responsive braking force against the rotation of the spool 30.

Further detail on the use of a piezo electric or ultrasonic motor is described herein.

Figures 4A, 4B, 4C, 4D, 4E:
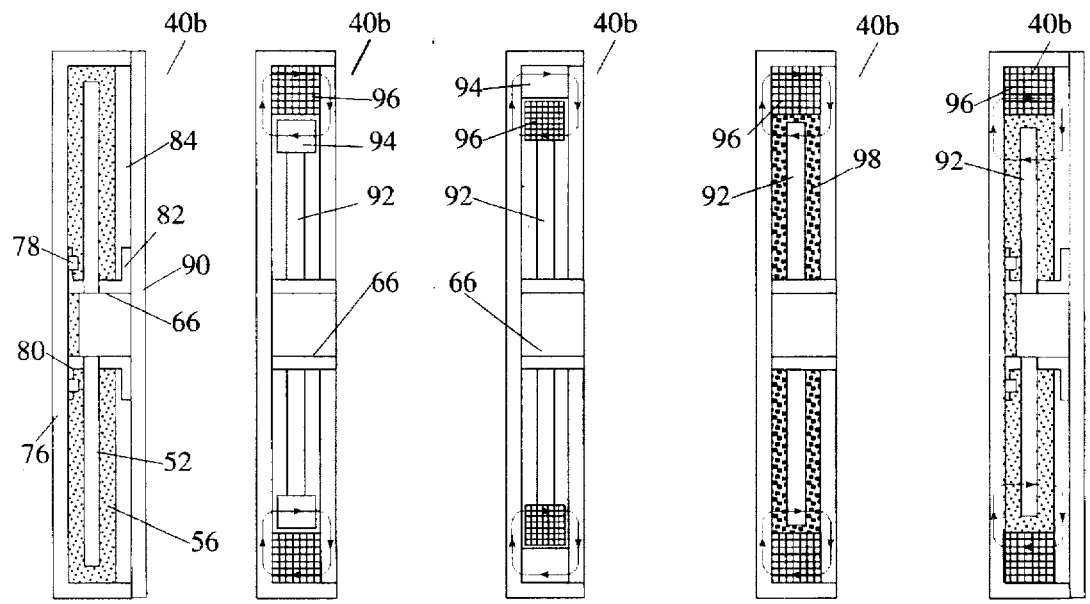
FIG. 4(a) is a cross sectional view of an inventive electrorheological fluid casting drag brake.
FIG. 4(b) is a cross sectional view of an inventive electromagnetic casting drag brake.
FIG. 4(c) is a cross sectional view of an alternative embodiment of an inventive electromagnetic casting drag brake.
FIG. 4(d) is a cross sectional view of an inventive magnetorheological fluid casting drag brake.
FIG. 4(e) is a cross sectional view of an alternative embodiment of an inventive magnetorheological fluid casting drag brake.

FIGS. 4(a)-5(d) show various configurations of casting drag brake 40b which may be used in accordance with the present invention. As shown in FIG. 4(a) the inventive ER fluid brake consists of a first shaft support 80 that is supported on mounting posts 78 fixed to a housing body 76, which rotationally supports a hollow shaft 66. The hollow shaft 66 engages (or is integrally formed) with a rotating electrode 52. The hollow shaft 66 is supported by a second shaft support 82 which passes through a housing cover 84 and has a flange that contacts an opposing surface of the housing cover 84 to provide a fluid seal to prevent leakage of the ER fluid 56. A sealing plate 90 may be disposed over the housing cover 84 to increase the effectiveness of the sealing of the ER fluid 56 within the housing body 76. The hollow member engages with an appropriate coupling member, such as a coupling protrusion 74, and is rotated by the spool 30. Thus, when the spool 30 rotates, the rotating electrode 52 rotates surrounded by the ER fluid 56. By applying a controlled variable electric field to the ER fluid 56, the resistance to rotation of the spool 30 is variably controlled to effectively prevent overrun, or bird nesting, of the spool 30.

FIG. 4(b) shows another configuration of the casting drag brake 40b in which a rotating plate 92 is rotated by a hollow shaft 66 (the hollow shaft 66 may have any construction effective to engage with and couple the rotation of the spool 30). A permanent magnet 94 is rotated by the rotating plate 92 and passes through magnetic field lines generated by an electromagnetic coil 96. By varying the energy applied to the electromagnetic coil 96, the strength of the magnetic field lines is variably controlled. Thus, the magnetic field generated by the electromagnetic coil 96 is effective to apply a braking force to the rotation of the spool 30. FIG. 4(c) shows a similar construction to that of FIG. 4(b), but in this configuration the electromagnetic coil 96 is rotated by the rotating plate 92. The configuration shown in FIG. 4(b) and 4(c) (as well as other configurations disclosed herein) impart a minimum internal resistance to the rotation of the spool 30 when the electromagnetic coil 96 is not energized. This feature may be particularly useful when extremely long distance casting is desired, in which case, during periods of the casting operation, the spool 30 drag should be minimum.

FIG. 4(d) shows another configuration of the casting drag, in which case, a magnetic particle brake construction is utilized. The magnetic particle brake includes a rotating plate 92 that is rotatably coupled with the rotation of the spool 30. The rotating plate 92 is surrounded by finely sized magnetic particles 98, such as stainless steel powder (SSP). Magnetic field lines generated by an electromagnetic coil 96 align the finely sized magnetic particles 98 into fibrils, thus applying a resistance to the rotation of the plate in proportion to the field strength applied by the electromagnetic coil 96. Similarly, an MR fluid may be utilized in the construction shown in FIG. 4(e), in which case, the formation of fibrils due to the alignment of suspended magnetizable particles is in proportion to the field strength applied by an electromagnetic coil 96. A rotating plate 92 coupled with the rotation of the spool 30 experiences a varying resistance depending on the applied field strength, thereby providing a controllable electronically variable brake 40.

FIGS. 5(a)-5(d) show alternative configurations of the casting drag brake 40b. These configurations comprise magnetically urged components. It is to be specifically noted that the construction of the various alternatives of the casting drag brake 40b may also be utilized in the construction of the fighting drag brake 40a. The casting drag brake 40b has a single rotating electrode 52 that receives a charge. The stationary electrode 52 is enclosed within the housing walls, which form oppositely charged stationary electrodes. In the case of fighting drag brake 40a, the number of elements (for example, the number of rotating electrodes 52 and corresponding stationary electrodes, may be increased and/or the components may be enlarged to provide a greater potential braking strength to resist the efforts of a hooked fish.

Figures 5A, 5B, 5C, 5D:
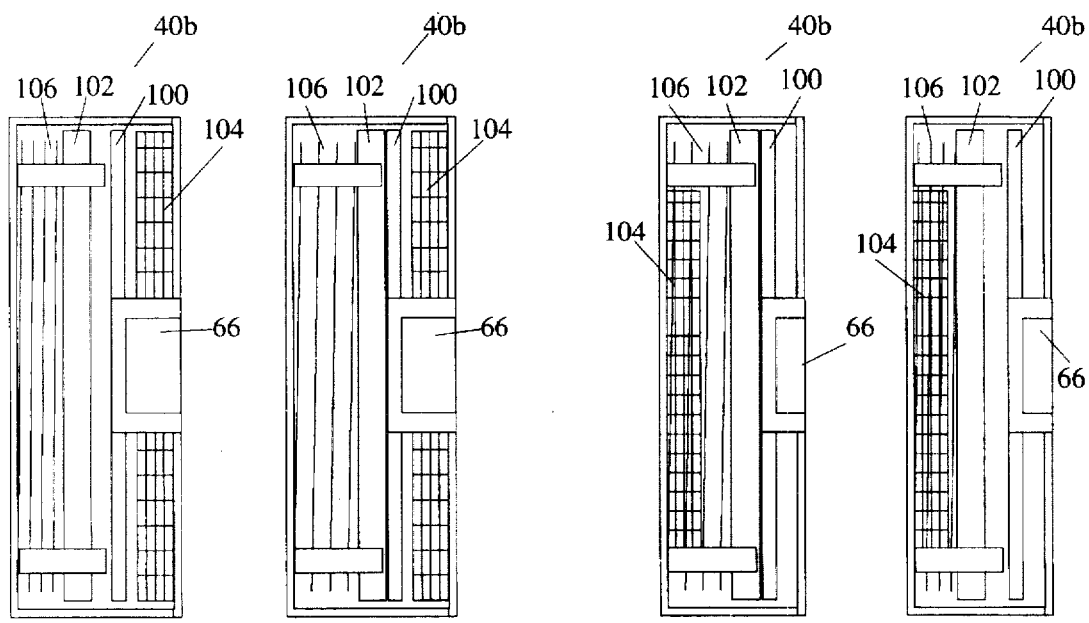
FIG. 5(a) is a cross sectional view of an inventive casting drag brake having magnetically urged components.
FIG. 5(b) is a cross sectional view of an alternative embodiment of an inventive casting drag brake having magnetically urged components.
FIG. 5(c) is a cross sectional view of another alternative embodiment of an inventive casting drag brake having magnetically urged components.
FIG. 5(d) is a cross sectional view of another alternative embodiment of an inventive casting drag brake having magnetically urged components.

The configuration shown in FIGS. 5(a)–5(d) include a rotatable friction surface 100 coupled with the spool 30 for rotation by the spool 30. A stationary friction surface 102 is provided to engage frictionally with the rotatable friction surface 100 to generate the braking force. An electronically controlled urging means, such as a magnetic field generating coil 104, urges either of the stationary friction surface 102 in an urging direction effective to vary a contact pressure between the stationary friction surface 102 and the rotatable friction surface 100. For example, as shown in FIG. 5(a), the stationary friction surface 102 (which may include a magnetic or magnetically reactive material) is pulled towards the rotating friction surface through the action of a magnetic field generated by the magnetic field generating coil 104. By varying the strength of the magnetic field, the contact pressure between the stationary friction surface 102 and the rotated friction surface 100 is varied to obtain an electronically variable brake 40. The electronically controlled urging means comprising the magnetic field generating coil 104 may be disposed behind the stationary friction surface 102, in which case the generation of the magnetic field pushes the non-rotated or stationary friction surface 102 in an urging direction towards the rotatable friction surface 100, and the strength of the applied magnetic field varies the frictional contact pressure and thus the braking force generated. A spring member 106 may be provided for biasing either the rotatable friction surface 100 or the non-rotatable or stationary friction surface 102 against the urging direction so that, as shown in FIGS. 5(a) and 5(d), when no field is applied, the non-rotated or stationary friction surface 102 is separated from the rotatable friction surface 100 to allow free rotation of the spool 30. As another alternative, during times when the magnetic field generating coil 104 is not energized, the spring member 106 may urge the non-rotating or stationary friction surface 102 into contact with the rotatable friction surface 100, and when energized, the non-rotated or stationary friction surface 102 is pulled away from the rotatable friction surface 100 to reduce the contact pressure, and thus the applied braking force, in a controllable and variable manner. Alternatively, this configuration of the electronically controllable variable brake can be constructed so that a friction member is urged axially outwards from the center of rotation and towards a stationary non-rotating friction drum surface (not shown). In this case, a centrifugal force on the friction member will be controllably enhanced by increased or decreased contact pressure depending on an applied magnetic field.

Figure 6A:
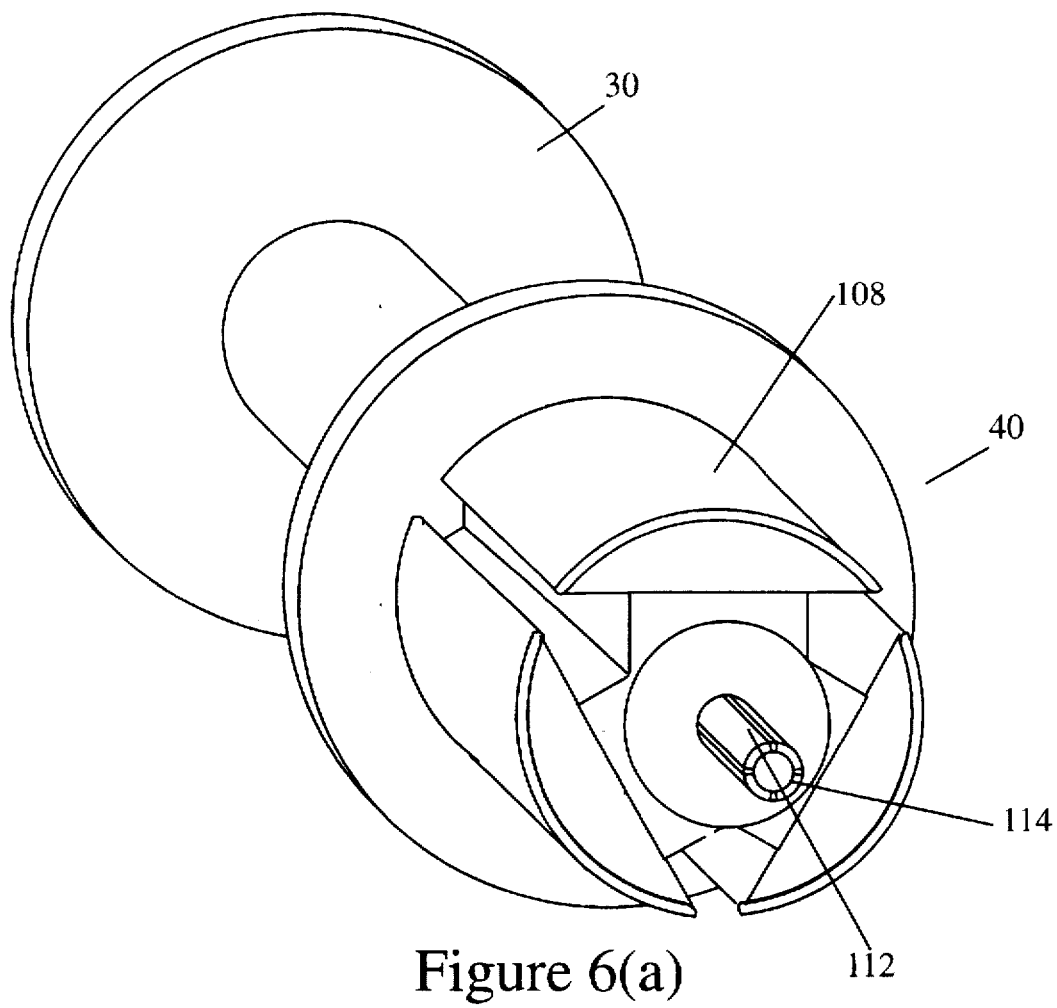
FIG. 6(a) is a perspective view of a spool having an integrally formed stator in accordance with an embodiment of the inventive bait casting fishing reel.
Figure 6B:
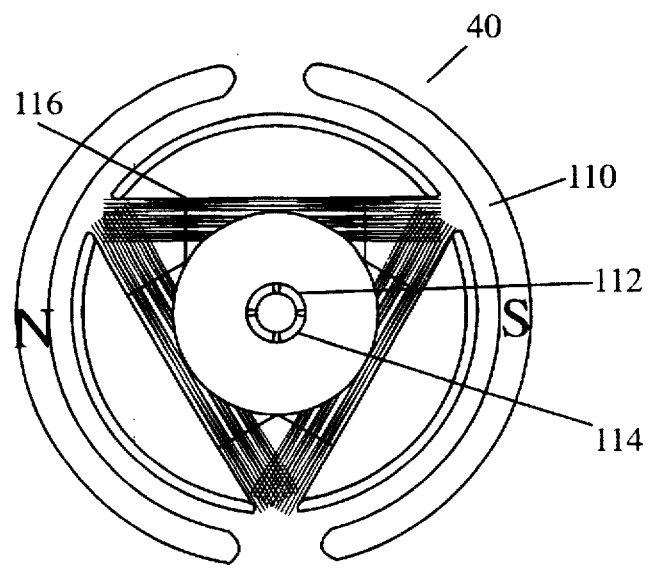
FIG. 6(b) is a side view of the spool shown in FIG. 6(a)

FIGS. 6(a) and 6(b) show another configuration of the electronically variable brake 40 coupled with the spool 30. In this case, the electronically variable brake 40 comprises either of a rotor 108 and a stator 110 of an electric motor rotatable by the spool 30 relative to the other of the stator 110 and the rotor 108. Thus, a rotor 108 may be formed integrally with a spool 30 (as shown in FIG. 6(a)), or may be coupled or attached in an assembly operation. Sliding electrical leads 112 are electrically insulated from a rotatably supported axle of the rotor 108 by an electrically insulating layer 114. During assembly, the rotor 108 has conductive coils 116 wound on it, and during use the sliding electrical leads 112 come into electrical contact with a DC voltage as the rotor 108 rotates (similar to a conventional DC motor). Thus, as shown in FIG. 6(b), a DC motor is formed comprising a rotor 108 rotatable by the spool 30 relative to a permanent magnet stator 110. Similarly, another motor construction (DC, AC, brushless, piezo electric, ultrasonic, etc.) can be utilized, having a structure in which the spool 30 rotates with the rotor 108 of the motor while the stator 110 is held relatively stationary. The rotor 108 may be coupled with the spool 30 through an alternatively constructed coupling mechanism, such as gearing, flexible shaft, or the like.

Figure 7A:
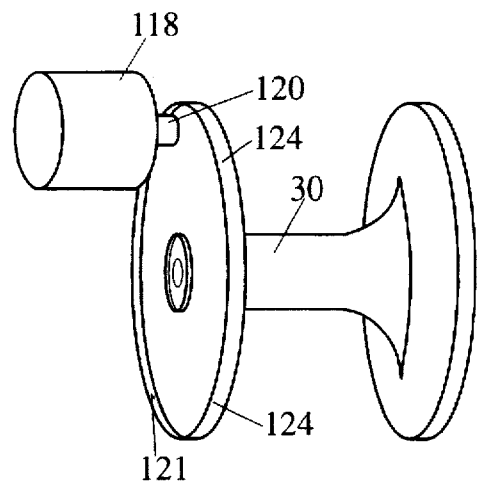
FIG. 7(a) is a perspective view of components of a configuration of an inventive bait casting reel having a rotationally driven brake.
Figure 7B:
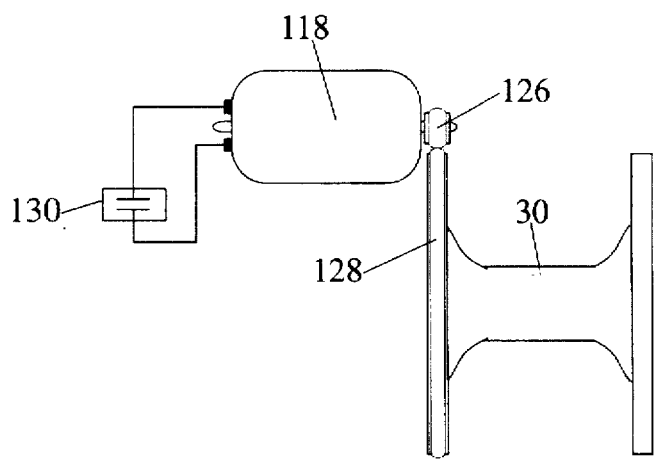
FIG. 7(b) is a view of an alternative configuration of an inventive bait casting reel having a rotationally driven brake.
Figure 7C:
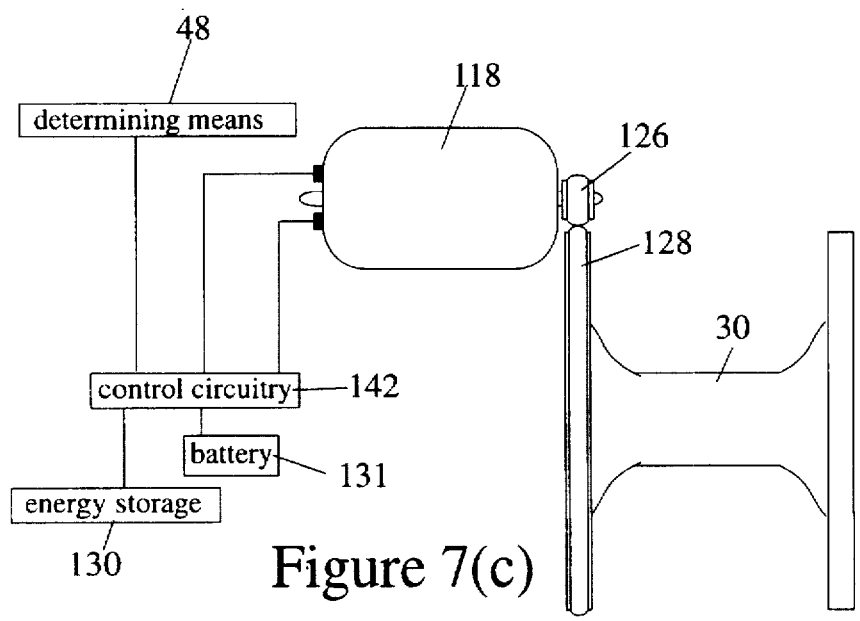
FIG. 7(c) is a view of another alternative configuration of an inventive bait casting reel having a roationally driven brake.

FIGS. 7(a)–7(c) show configurations of an inventive bait casting reel having a rotationally driven brake. As shown in FIG. 7(a), a drive motor 118 can be used to provide a rotational driving force applied in an opposite direction as the rotation of the spool 30 to apply a braking force on the spool 30. The drive motor 118 may be, for example, a DC electric motor, an AC electric motor, a piezoelectric motor, a stepper motor, an ultrasonic motor, rotational solenoid, or the like. The drive motor 118 may be used to drive a drive gear 120, which in turn engages with and drives a drive gear 120 structure fixed or integrally formed with a flange 124 of the spool 30 (FIG. 7(a)). Alternatively, as shown in FIG. 7(b), the drive motor 118 may drive a driving surface 126, such as a resilient rubber or plastic wheel, which engages with an appropriately constructed driven surface 128 formed or disposed on the spool 30. During times when the spool 30 is being rotated, by, for example, the momentum of a projected lure or weight, the drive motor 118 may act as a generator to produce electrical energy that is stored in a capacitor 130. The temporarily stored electrical energy in the capacitor 130 can later be used to apply an electromotive force to the motor so that it is operated to drive the driven surface 128 in a direction opposite the direction of rotation of the spool 30. The drive motor 118 may act as a generator when driven by the rotating spool 30, and the energy generated may be simultaneously fed back with a reverse polarity to the drive motor 118 to generate a braking force. The application of electricity to the drive motor 118 is controlled through an appropriate analog or digital circuit so that the projected lure has the desired flight characteristics, while the bird nesting phenomenon is eliminated.

To cause the spool 30 to act as if it is frictionlessly supported (i.e., no frictional loss due to bearing surfaces), a small voltage can be applied to the drive motor 118 to drive the driven surface 128 so that the spool 30 is driven in the same direction as the spool 30 is being rotated by the line being pulled by the projected lure or weight. This small forward driving voltage is applied to overcome internal magnetic and frictional resistance of the drive motor 118, spool 30 shaft, bearings, etc. so that the spool 30 behaves as if supported by frictionless bearings (under the control of a drive circuit which may include a microprocessor). The spool 30 may be forwardly driven in the same direction as it is being rotated by the line being played out during a cast with a sufficient driving force so that the inertia of the spool 30 (and any other resistance experienced by the projected lure and line) is negated so as to optimize the casting distance obtainable utilizing the inventive reel. The drive motor 118 may also be used to drive the spool 30 in a direction effective to retrieve the line to assist a physically challenged or weak person when reeling in a fish. The drive motor 118 speed can be controlled in proportion to the cranking speed of the crank handle 34 by sensing the rotational velocity of the crank handle 34 being rotated by the angler. The drive motor 118 speed can also be controlled by a lever 192 or push button SMA actuator, so that even a severely handicapped person can reel in a fish, or any angler can be assisted when reeling in a particularly strong or heavy fish.

FIG. 7(c) schematically shows the drive motor 118 driving the spool 30 and its attendant circuitry. When the drive motor 118 is acting as a generator, control circuit 142 is used to direct the current being generated to an energy storage device, such as a capacitor 130 or battery. When the motor is used to apply a braking driving rotation through the driving surface 126 driving the driven surface 128 of the spool 30, the control circuit 142 taps the energy stored in the energy storage device and/or taps a battery. As will be described in detail below, a sensing device determines the status of sensed parameters, such as the line tension or line strand position, and this information is received by the control circuit 142 where an appropriate response to the sensed information is sent to the drive motor 118. The control circuit 142 can include a microprocessor so that a variety of advantageous enhancements of the inventive reel can be obtained. For example, the microprocessor can be programmed with a form of artificial intelligence so that it learns the casting pattern of an angler over a series of sequential casts. Information pertaining to spool velocity, braking application and casting duration can be stored for a number of casts and this information can be utilized to refine the application of braking force or resistance negating driving force from the motor to optimize the cast.

Figure 8A:
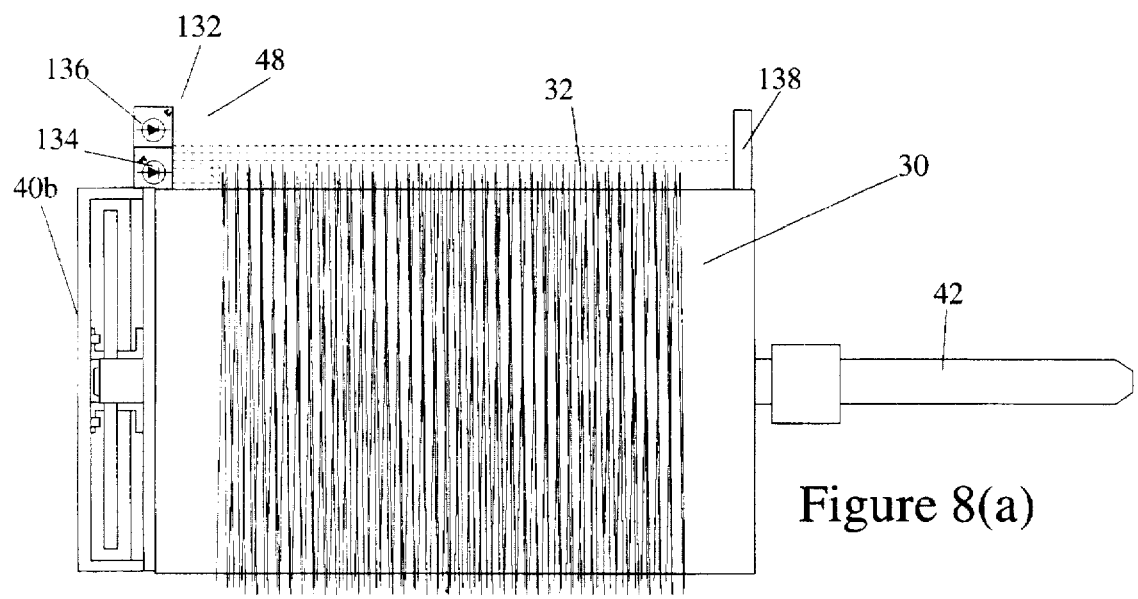
FIG. 8(a) is a view of components of an embodiment of the inventive bait casting reel having a photo-detector for determining an overrun status.

Referring to FIGS. 8(a)–8(d), in accordance with the present invention, determining means 48 determines an overrun status while a length of line is being released from the spool 30 and generates a status signal dependent thereon. As shown in FIG. 8(a), the determining means 48 may comprise position detecting means 132 for detecting a position of strands of the length of line held on the spool 30. In this case, a photo-emitter 134 emits a light beam (infrared beam, etc.) and a portion of the emitted light beam hitting the bundle of line wrapped tightly on the spool 30 is totally reflected back to a photo-detector 136. A portion of the light beam that does not reflect from the bundle of tightly wrapped line is transmitted and absorbed by an infrared absorbing material 138 on the opposite side of the spool 30 so as to not influence the detection of reflected light.

Figure 8B:
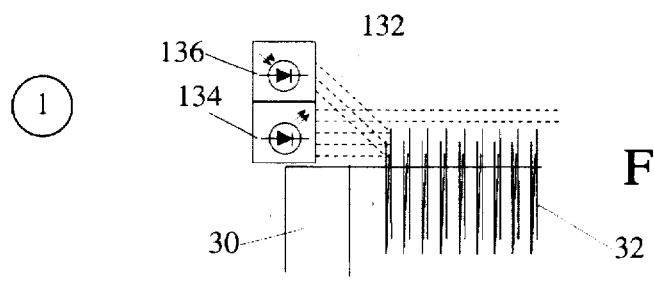
FIG. 8(b) is an isolated view of the photo-detector shown in FIG. 8(a) prior to an overrun of the line wrapped on the spool.
Figure 8C:
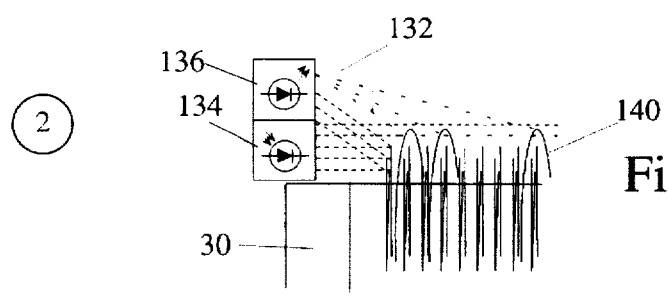
FIG. 8(c) is an isolated view of the photo-detector shown in FIG. 8(a) at the beginning of an overrun of the line wrapped on the spool.
Figure 8D:
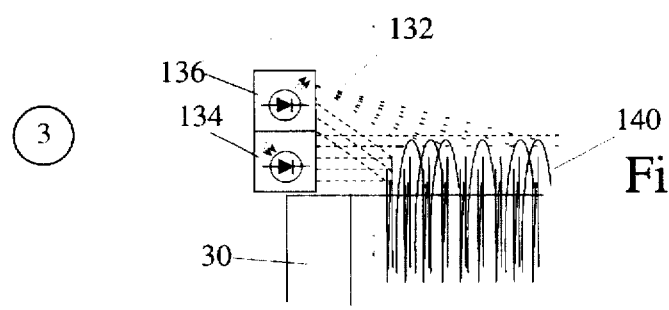
FIG. 8(d) is an isolated view of the photo-detector shown in FIG. 8(a) during an overrun of the line wrapped on the spool.

As shown in FIGS. 8(b)–8(d), as the spool 30 overruns the line being played out (i.e., the speed at which the line is being played out is slower than the speed at which the spool 30 is rotating), partially reflected light from the individual strands 140 that expand off the tightly wound bundle due to the overrun of the spool 30 is detected by the photo-detector 136 thereby increasing the total amount of detected light. The total amount of detected light includes the totally reflected light from the tightly wrapped bundle of line and the partially reflected light from the individual strands 140 as the strands expand away from the spool 30. Thus, the transmitted light includes a fully transmitted portion and an attenuated transmitted beam which is absorbed by an infrared absorber (FIG. 8(c)).

As more of the individual strands 140 from the bundle of tightly packed line become loose and expand from the spool 30, more of the light emitted by the photo-emitter 134 is partially reflected from these individual strands 140. Thus, the total detected light increases as the bird nesting or overrun proceeds. The photo-emitter 134 and photo-detector 136 act to detect the position of the individual strands 140 of the length of line held on the spool 30.

This information is received by a control circuit 142 that controls the electronically variable brake 40 (casting drag brake 40b) to apply a variable braking force to resist rotation of the spool 30 during casting, greater braking force is applied when the position of the strands indicates that a portion of the line held on the spool 30 is wrapped loose on the spool 30 (FIGS. 8(c) and 8(d)). Less braking force is applied when the position of the line indicates that the line held on the spool 30 is wrapped tight on the spool 30 (FIG. 8(b)). By thus controlling the variable braking force, the spool 30 is prevented from overrunning the length of fishing line 32 being released from the spool 30 during casting, while maximizing the casting distance.

Figure 9:
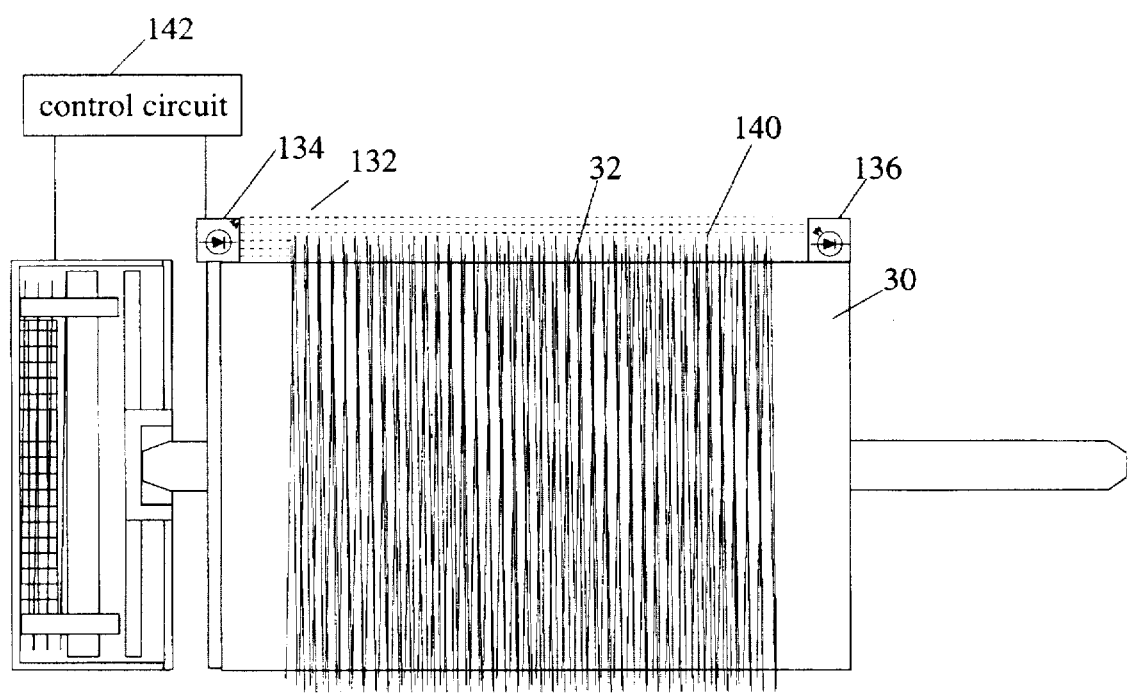
FIG. 9 is a view of components of another embodiment of the inventive bait casting reel having a photo-detector for determining an overrun status.

FIG. 9 shows an alternative configuration of the position detecting means 132 in which the photo-emitter 134 emits a light beam across the line wrapped on the spool 30 and the transmitted light beam is detected by the photo-detector 136. The amount of light that is transmitted is dependent on the degree to which the line is becoming loosened from the spool 30 as the spool 30 begins to overrun. The photo-emitter 134 and photo-detector 136 detect the position of the individual strands 140 of the length of line held on the spool 30. The control circuit 142 controls the electronically variable brake 40 (casting drag brake 40b) to apply a variable braking force to resist rotation of the spool 30 during casting. A greater braking force is applied when the position of the strands indicates that a portion of the line held on the spool 30 is wrapped loose on the spool 30 (FIGS. 8(c) and 8(d)). Less braking force is applied when the position of the line indicates that the line held on the spool 30 is wrapped tight on the spool 30 (FIG. 8(b)). By thus controlling the variable braking force, the spool 30 is prevented from overrunning the length of fishing line 32 being released from the spool 30 during casting, while maximizing the casting distance.

Figure 10A:
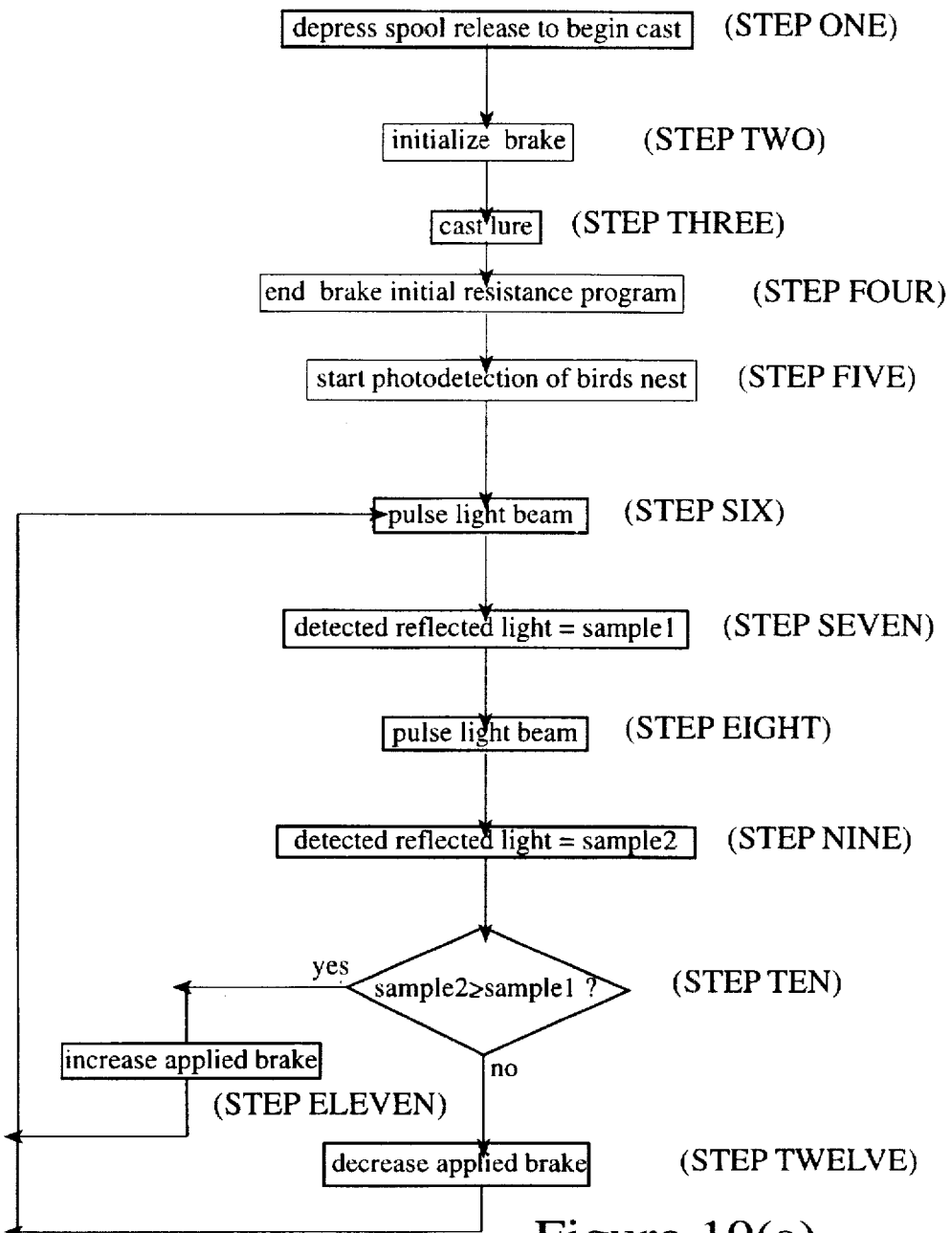
FIG. 10(a) is a flow chart illustrating an algorithm for controlling the rotation of a spool during a casting operation in accordance with the present invention.

FIG. 10(a) is a flow chart of an algorithm to sample and compare the detected reflected light during the unwinding of the line from the spool 30. To begin the casting operation, the user depresses the casting release lever 46 (step one). A brake initialization operation (step two) occurs just at the start of the cast. The brake initialization operation begins when the casting release lever is released and just before the lure is projected (step three). The brake initialization operation controls the rotation of the spool 30 to optimize the cast. For example, during the brake initialization operation, a rotationally driven member (see FIG. 7) may be used to impart a slight forward rotation to the spool to overcome initial resistance of rotation due to friction losses, inertia, etc. The brake initialization operation may control the rotation of the spool 30 at the onset of the casting operation so as to resist rotation when the projected lure is imparted with its maximum acceleration. The exact constraints imposed on the rotation of the spool 30 by the brake initialization operation may depend on various factors, such as the weight of the lure, type of fishing pole used, line test strength, etc.

The brake initialization operation ends after performing its controlling function (step four). During the cast, as the lure is being projected and the spool 30 is rotating, a photo detection begins to detect the existence of an overrun or birds nest of the line (step five). The light beam is emitted from the photo-emitter 134 (step six) and the light reflected or transmitted, depending on the construction of the detecting means 132, is detected by the photodetector 136 to obtain a value of a first sample (step seven). The light beam is emitted again (step eight), and a value of a second sample is determined from the light detected by the photo-detector 136 (step nine). The first sample is compared with the second sample (step ten). In the case of a reflector-type construction (shown in FIGS. 8(a)–8(d)), if the second sample is greater than the first sample, then a potential overrun is determined and an increased braking force is applied to slow the rotation of the spool (step eleven). On the other hand, if sample 2 is less than or equal to sample 1, then less braking force is applied (or no braking force is applied) to allow the spool to rotate with more ease (step twelve). The operations of steps six through twelve continue until the cast is completed and the spool 30 stops rotating. Thus, the rotation of the spool 30 is automatically controlled to maximize the casting distance, while preventing the occurrence of an overrun or birds nest. A similar flow chart would describe the transmittance-type construction shown in FIG. 9, however, in this case, if sample 2 is greater than or equal to sample 1 in step 10, then it is determined that an overrun is not occurring, and the braking force is decreased. If sample 2 is less than sample 1, then an overrun is occurring, and braking force is increased. In the case of the tension sensors 144 described herein, a similar flow chart would describe the operation of the inventive bait casting reel. However, in the case of the tension sensors, the control of the applied braking force (steps six through twelve) will depend on line tension rather than on reflected or transmitted light.

Figure 10B:
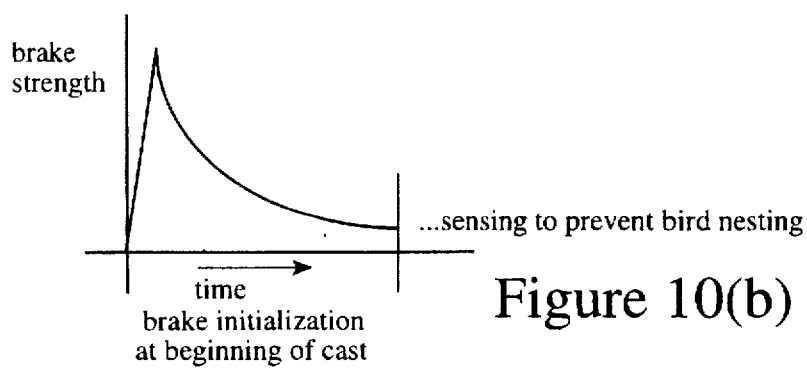
FIG. 10(b) is a graph illustrating a brake initialization procedure in accordance with the present invention.

As shown in the graph shown in FIG. 10(b), the brake initialization operation (step two) may require the brake strength to be increased quickly during the time that the projected lure is imparted with its maximum acceleration. This initialization operation automatically slows the rotation of the spool 30 during the beginning of a cast. After the brake strength has decayed, the photo detection sampling and comparing maintains the correct balance of braking force on the spool 30 to prevent bird nesting while enabling a long cast. As described above, the brake initialization operation may vary, depending on a number of factors, and the graph shown in FIG. 10(b) illustrates only one of the potential constraints on the rotation of the spool 30 that are useful during the brake initialization operation.

Figure 11A:
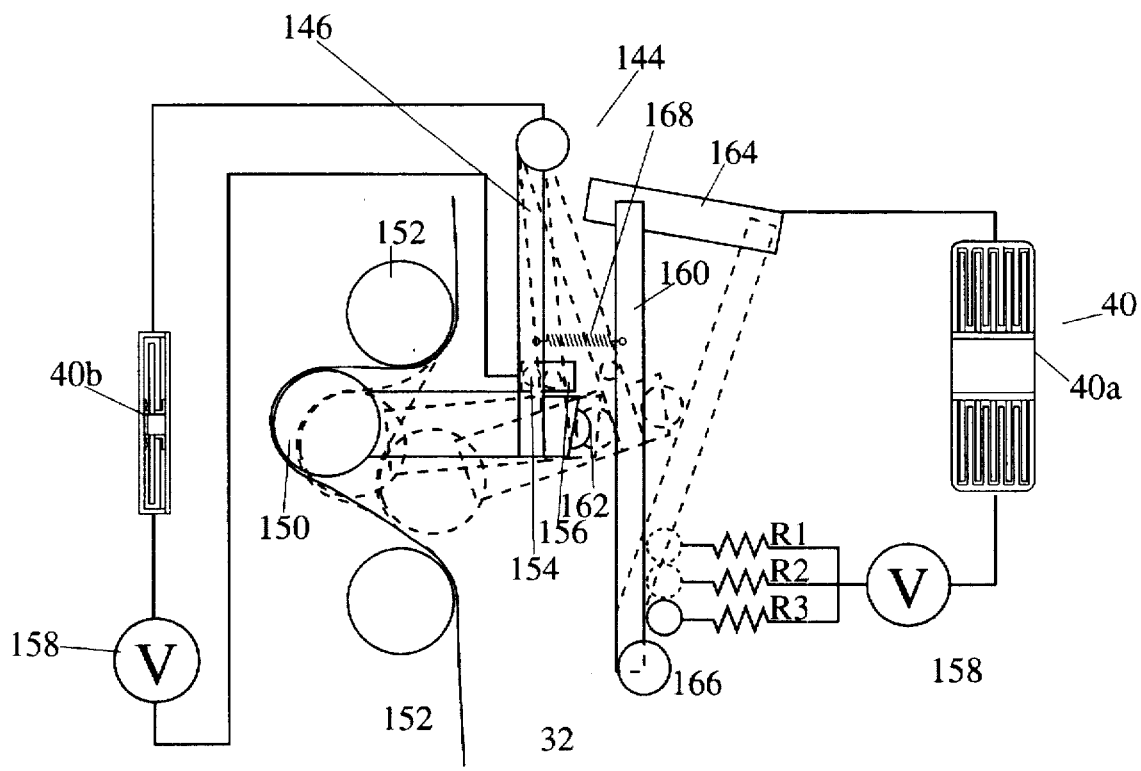
FIG. 11(a) schematically shows an inventive line tension sensor.
Figure 11B:
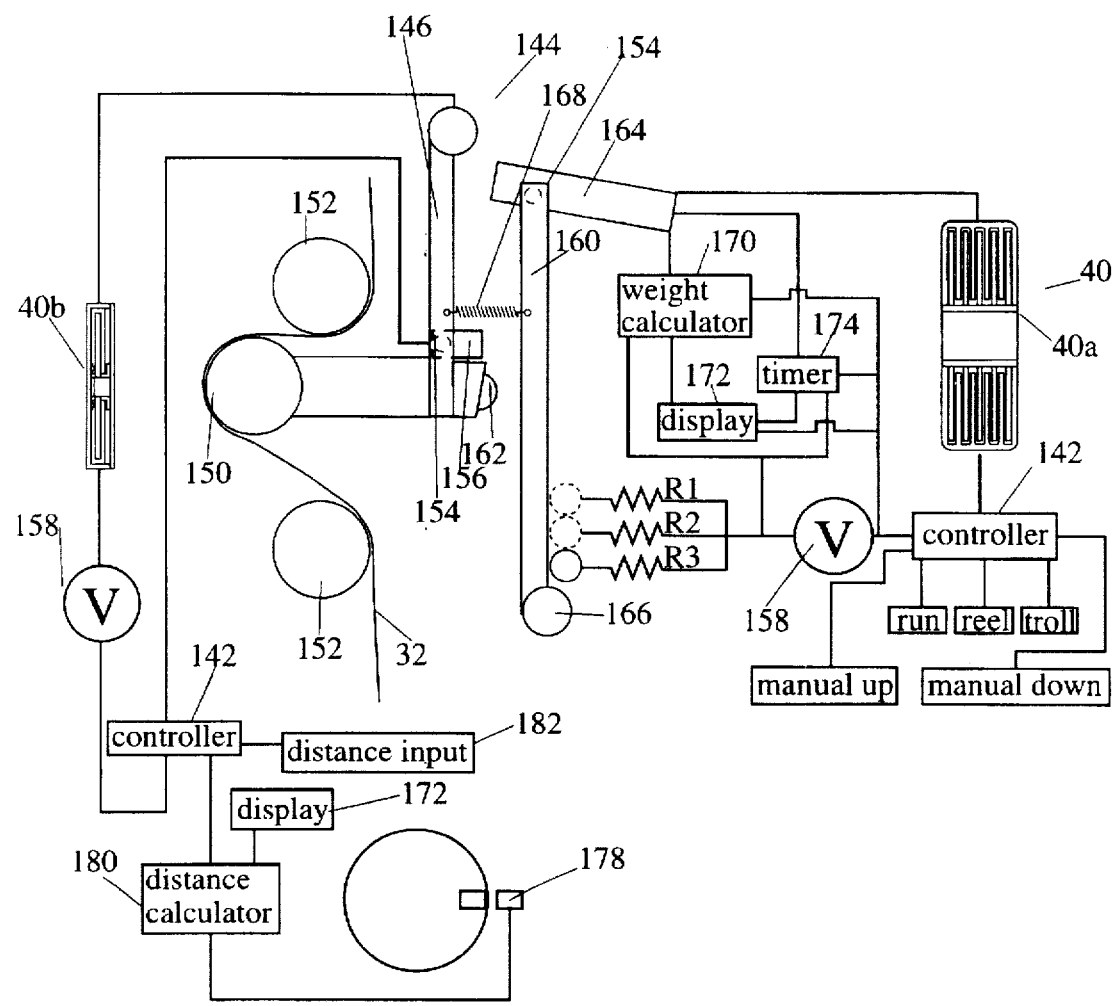
FIG. 11(b) schematically shows another embodiment of an inventive line tension sensor.

FIGS. 11(a) and 11(b) show a configuration of the determining means 48 in which a tension sensor 144 is used for sensing a tension on the fishing line 32 being released from or retrieved onto the spool 30. The tension sensor 144 generates a tension signal dependent on the line tension, which is received by a control circuit 142 (FIG. 11(b)) for controlling the electronically variable brake 40 in response thereto. In this case, the tension sensor 144 includes a small spring arm 146 pivotally mounted on a support frame 148 (shown in FIG. 1(b)) and having a movable roller 150 fixed thereto. The fishing line 32 is thread over the movable roller 150 passing first through a stationary roller 152 and then exiting passing over another stationary roller 152. As the line tension increases, the line is stretched over the movable roller 150 causing it to move and thereby pivot the small spring arm 146 against its spring tension. The small spring arm 146 has an electrical contact 154 associated with it that makes contact with a casting drag resistance strip 156.

An electrical circuit for the casting drag electronically variable brake 40 includes a variable power source 158 (which may be pulsed and/or voltage or current varied), the casting drag brake 40b, the electrical contact 154 and the casting drag resistance strip 156. The amount of electric potential applied to the casting drag brake 40b from this circuit is varied depending on the position of the electrical contact 154 on the casting drag resistance strip 156. As the electrical contact 154 moves away from the terminal end of the casting drag resistance strip 156, the resistance in the circuit increases and thus the braking force applied by the casting drag brake 40b decreases. Thus, during a cast as the line tension due to the momentum of the projected lure and the played out line creates a tension on the line, displacement of the movable roller 150 causes the resistance in the circuit due to the position of the electrical contact 154 on the casting drag resistance strip 156 to be increased resulting in a decrease of the casting drag brake 40b against the rotation of the spool 30. As the line tension becomes less, and the line begins to slacken, the potential for overrun occurs. In this case, the circuit resistance caused by the position of the electrical contact 154 on the casting drag resistance strip 156 decreases due to proximity of the electrical contact 154 to the terminal end of the strip. The electrical energy applied to the casting drag brake 40b is increased, so as to slow the rotation of the spool 30 thereby increasing the tension on the line. An equilibrium is maintained whereby the spool 30 rotation relative to the speed at which the line is played out from the spool 30 is optimized.

When the line is being retrieved, such as when bringing in a hooked fish, a large spring arm 160 is moved when a sliding bearing 162 of the movable roller 150 comes into sliding contact with it. As the tension on the line becomes greater, the distance between a terminal end of a fighting drag resistance strip 164 and an electrical contact 154 of the large spring arm 160 becomes less, thereby applying a greater braking force through the fighting drag brake 40a. The effective spring constant of the large spring arm 160 can be controlled by positioning a selection pin contact 166 in any one of a plurality of holes. Each hole is positioned so that the spring constant of the large spring arm 160 is appropriate for a predetermined line test strength. The selection pin contact 166 in contact with the large spring arm 160 is part of the electrical circuit including a variable power source 158, the fighting drag brake 40a, the fighting drag resistance strip 164 and the electrical contact 154. An appropriate resistor is included in this circuit (R1–R3), depending on the position of the selection pin contact 166. The resistor varies the base line of the energized fighting drag brake 40a so as to be appropriate for the line test strength of the fishing line 32 held by the spool 30. A balancing spring 168 ties the small spring arm 146 with the large spring arm 160, and may be included to provide a bias urging force on the small spring arm 146 so that extremely small fluctuations in tension on line can be sensed during casting.

FIG. 11(b) schematically shows the line tension sensor 144 and various circuit components for providing a variety of features. A weight calculator 170 may be included by which the weight or the fighting strength of a fish can be determined depending on the selection pin contact 166 position and its corresponding resistor (R1–R3) and the position of the electrical contact 154 on the fighting drag resistance strip 164. A display device 172, which may be an LCD display 172 or the like, receives the weight information from the weight calculator 170 and displays it to the angler.

A timer 174 may be included for counting the time elapsing during the duration of the landing of a fish from the time it is hooked (in which case the electrical contact 154 of the large spring arm 160 will come into contact or move on the fighting drag resistance strip 164) and the time that the fish is landed (which may be manually inputted by the angler). A clock 176 may be included so that the time of day may also be displayed on the display 172 device.

The control circuit 142 can accept user inputted settings to manually increase or manually decrease (manual-up, manual-down) the strength of the braking force applied by the fighting drag brake 40a. The control circuit 142 may also receive user input in the form of selection buttons for "run", "reel" and "troll". If the selection button "run" is pressed, then the fighting drag brake 40a receives an amount of energy through the control circuit 142 that is just below the line tension determined by the position of the large spring arm 160 electrical contact 154 on the fighting drag resistance strip 164. If the "reel" selection button is depressed, then the control circuit 142 supplies an amount of energy to the fighting drag brake 40a that is greater than the line tension, thereby enabling the retrieval of the line. If the "troll" selection button is depressed, then the control circuit 142 supplies the energy necessary for the fighting drag brake 40a to equalize the line tension, which, of course, varies as the large spring arm 160 is urged by the movable roller 150.

A rotation sensor 178 can be used to determine the rotation of the spool 30 from which can be measured the casting distance, or the amount of line played out from the spool 30, by a distance calculator 180. Also, the user can input a selected distance through a distance input 182, which is received by a control circuit 142. The control circuit 142 then receives the information from the spool 30 rotation sensor 178 and distance calculator 180, so that when the input distance is achieved during a cast, a braking force is applied via the casting drag brake 40b so that the line is stopped from being played out from the spool 30 and the cast lure is projected the preselected distance. The control circuit 142 may include an algorithm executed by a microprocessor, an analog circuit or a digital circuit, or other means for varying the casting drag brake 40b in response to the distance input 182 so that the applied braking force results in a smooth and elegant cast to precisely the desired distance.

Figure 12A:
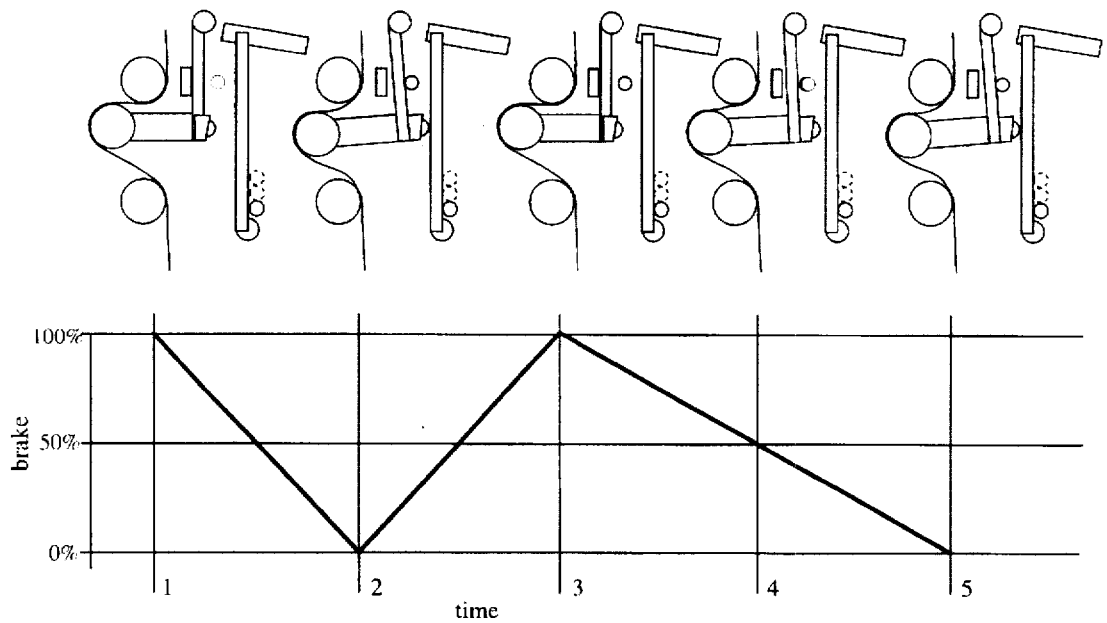
FIG. 12(a) is a graphical illustration of the relative position of the components of the inventive line tension sensor and the applied braking force from the inventive casting drag brake during a casting operation.

FIG. 12(a) shows the relative position of the components of the tension sensor 144 and the percentage of the applied braking force from the casting drag brake 40b. It is noted that this Figure shows the applied braking force over time by way of example only, and a graph showing an actual cast controlled in accordance with the present invention may or may not be similar. The line tension on the movable roller 150 is minimal such as at the beginning of a cast, and so the braking force applied by the casting drag brake 40b is maximum (100%). At time 2, the line tension during the cast causes the movable roller 150 to flex the small spring arm 146, causing the electrical contact 154 to slide along the casting drag resistance strip 156 so that a minimal braking force (0%) is applied. At time 3, the line tension is again a minimum, indicating that an overrun is about to occur (since the spool 30 is rotating faster than the line is being played out). Thus, the applied braking force is instantaneously brought to an appropriate degree (in this case, maximized at 100%) to quickly slow the rotation of the spool 30. At time 4, the line tension is half way between the minimum and the maximum so the applied braking force is at 50%. Again, at time 5, the line tension is at the casting maximum, so the applied braking force is again 0%. In actual use, the applied braking force is nearly instantaneously varied between 0 and 100% during the casting operation so that an appropriate braking force is applied to the spool 30 to minimize the bird nesting phenomenon and to maximize the casting distance. A microprocessor having an appropriate clock speed can be used to sample the line tension and control the braking force in response thereto so that very efficient use is made of the energy imparted to the lure by the angler (i.e., the casting energy exerted by the angler is used almost fully to project the lure with very little of it being lost to over control of the rotation of the spool 30). Also, an analog circuit (such as that shown in FIG. 11(b)) can be used without a microprocessor for automatic control of the applied braking force.

Figure 12B:
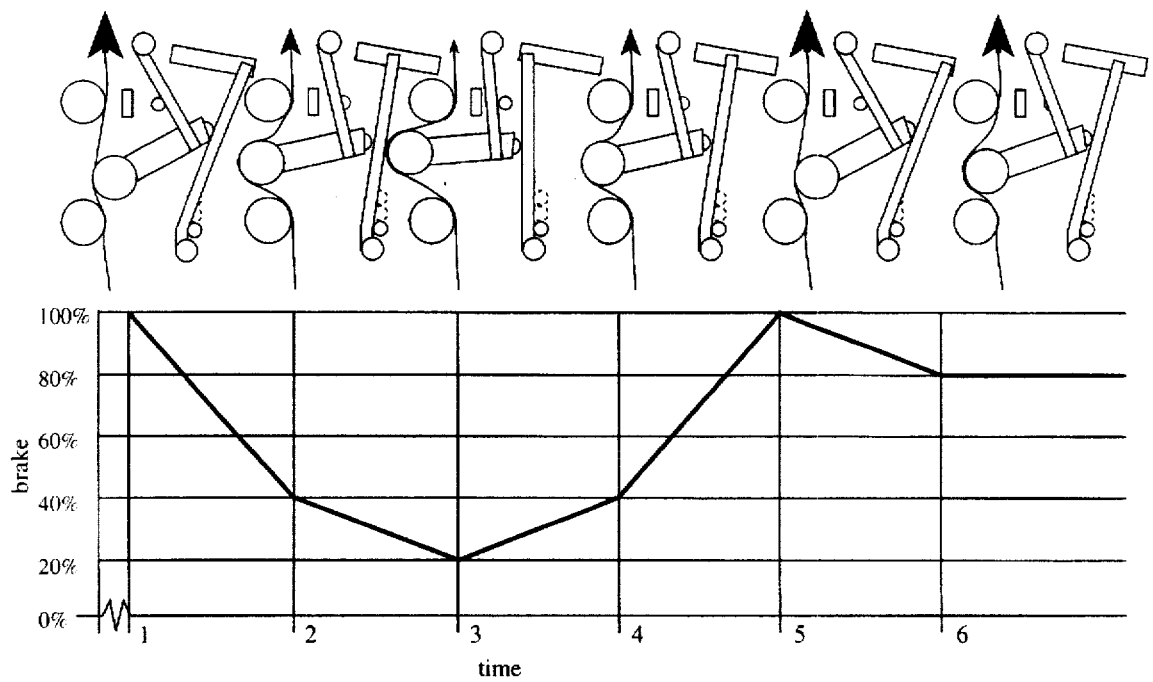
FIG. 12(b) is a graphical illustration of the relative position of the components of the inventive line tension sensor and the applied braking force from the inventive casting drag brake during the fight of a fish.

FIG. 12(b) shows the relationship of the various components of the line tension sensor 144 during the fight of a fish, or the retrieval of the line. In this case, at time 1 it is assumed that the fish has just taken the lure and the hook is being set by the angler. Thus, the line tension is maximized and the applied braking force from the fighting drag brake 40a is at 100%. At time 2, the fight of the fish results in the line tension being somewhere between 0 and 100% of the maximum, so the braking force is appropriately applied at 40%. At time 3, only 20% of the braking force is needed to overcome the fight of the fish and retrieve the line (it is to be noted that in this case the controller 50 is set to the "reel" push button selection). The fight continues through time 4, 5 and 6, wherein the appropriate braking force is applied depending on the sensed line tension.

Figure 13A:
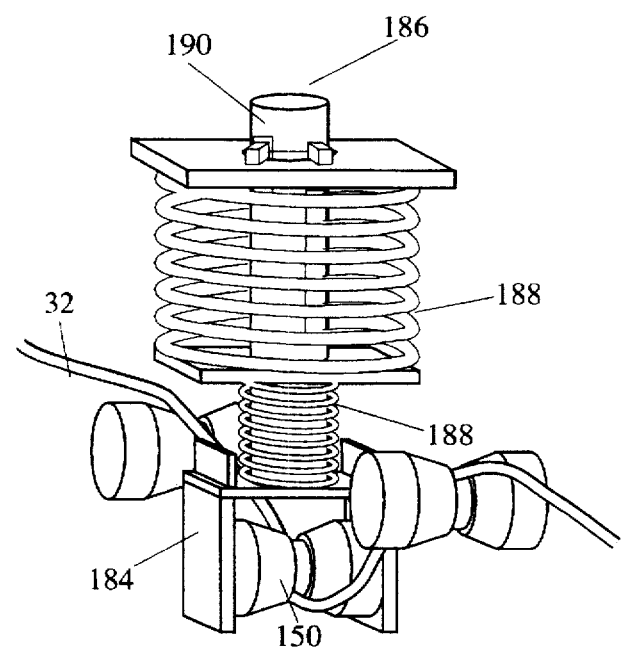
FIG. 13(a) is a perspective view of an alternative configuration of the line tension sensor.
Figure 13B:
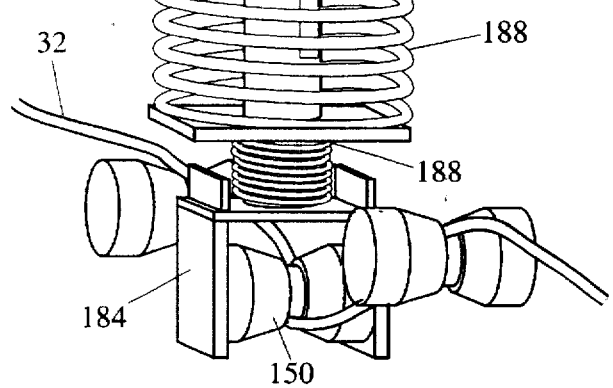
FIG. 13(b) is a perspective view of the alternative configuration of the line tension sensor shown in FIG. 13(a) showing tension on the line.
Figure 13C:
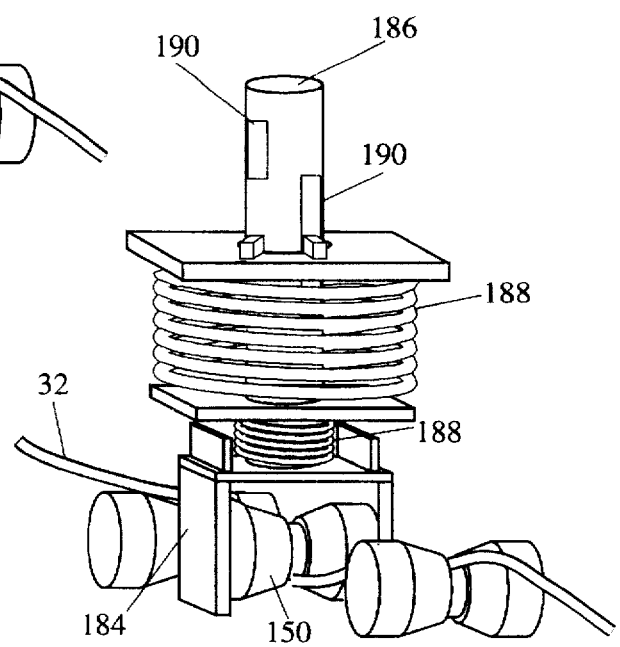
FIG. 13(c) is a perspective view of the alternative configuration of the line tension sensor shown in FIGS. 13(a) and 13(b) showing increased tension on the line.

FIGS. 13(a)–13(c) show an alternative configuration for the line sensor. In this configuration, the movable roller 150 is supported on a support platform 184 which is in turn supported on a post 186. The post 186 is mounted so it can move up and down against the urging forces of the springs 188 and the line tension. The smaller spring 188 is relatively easy to compress, and is used to sense the line tension during the cast. In this case, the post 186 moves up and down depending on the line tension, with the post 186 being at its down-most position when the line tension is at a casting minimum (FIG. 13(a)), and the post 186 at its casting maximum height above the platform when the line tension is at its casting maximum (FIG. 13(b)). By sensing the relative position of the post 186 height, the appropriate casting brake drag can be applied to controllably slow the rotation of the spool 30 to prevent bird nesting, and to allow for a maximum casting distance. The height can be sensed using a variety of constructions, such as resistance strips 190 on the post 186 (one for the casting drag and one for the fighting drag), the movement of a lever by the post 186 (not shown), information obtained from a plurality of electrical contacts formed on the post 186 etc. In a similar manner, the fighting line tension during the fight of a hooked fish is sensed. The line tension during the fight of a hooked fish compresses the larger spring 188, which is sensed to appropriately control the fighting drag brake 40a.

Figure 14A:
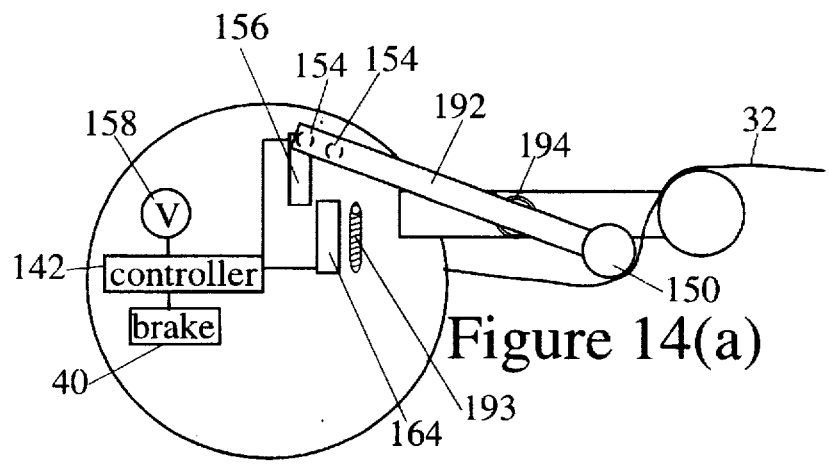
FIG. 14(a) is a schematic view of an another alternative configuration of the line tension sensor.
Figure 14B:
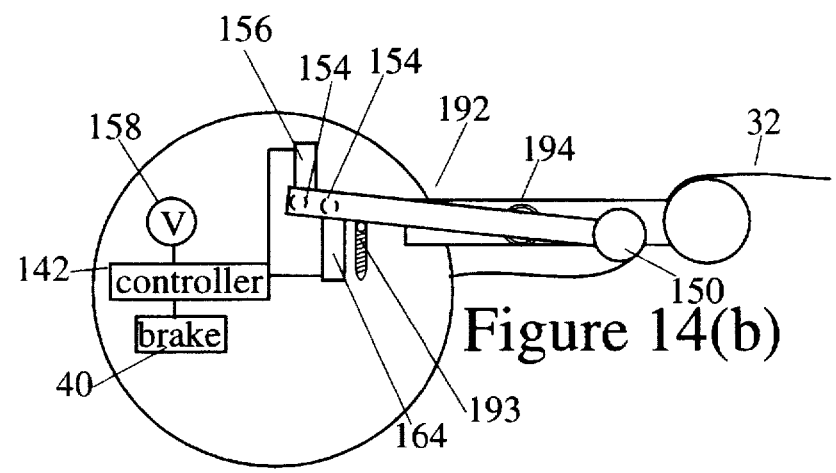
FIG. 14(b) is a perspective view of the alternative configuration of the line tension sensor shown in FIG. 14(a) showing tension on the line.
Figure 14C:
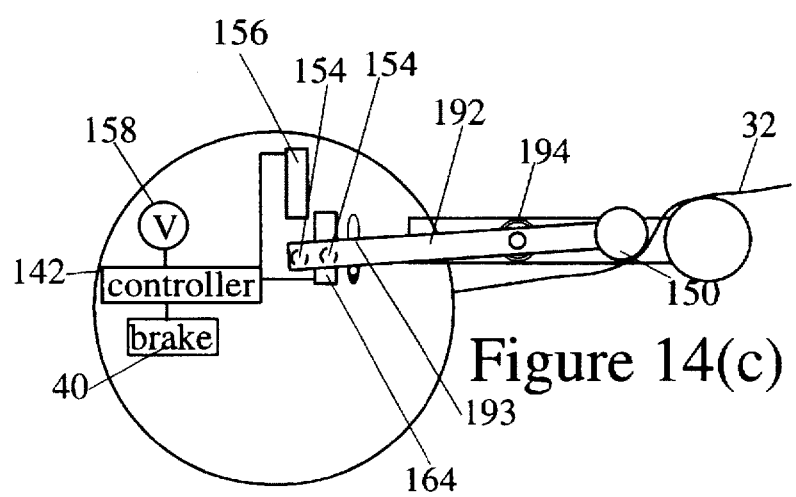
FIG. 14(c) is a perspective view of the alternative configuration of the line tension sensor shown in FIGS. 14(a) and 14(b) showing increased tension on the line.

FIGS. 14(a) and 14(b) show an alternative configuration for the line tension sensor 144. In this configuration, a lever 192 is pivoted about a pivot point and has a moving roller fixed at one of its ends. At the other end of the lever 192 are a casting drag electrical contact 154 and a fighting drag electrical contact 154 which complete an electrical circuit by contacting the respective casting drag resistance strip 156 and fighting drag resistance strip 164 depending on the pivot position of the lever 192. The fishing line 32 is threaded over the moving roller and over a stationary roller 152 so that a tension applied to the fishing line 32 causes the lever 192 to pivot. As tension is applied to the line, the moving roller is urged upwards causing the lever 192 to pivot against an urging force applied by a coil spring 194 188. As the lever 192 pivots during casting (due to the line tension acting on the movable roller 150), the fighting drag electrical contact 154 slides along the casting drag resistance strip 156, which is constructed so that when no tension on the line exists (i.e., during times when backlash is likely), the braking force applied to the spool 30 by the casting drag brake 40b is maximum. As the line tension increases during the cast (i.e., the line is being played out from the spool 30 at a rate equal to or greater than the rotation of the spool 30) the position of the electrical contact 154 on the casting drag resistance strip 156 results in the brake applying less of a braking force on the spool 30 so that the spool 30 rotates more freely. In this manner, the backlashing tendency of the spool 30 is prevented while allowing for a maximum casting distance. When a fish is hooked and is being retrieved, the line tension causes the moving roller to pivot the lever 192 so that the fighting drag electrical contact 154 comes into contact with the fighting drag resistance strip 164. The fighting drag resistance strip 164 is constructed so that when the line tension is low, the braking force applied is also low. As the line tension increases, the lever 192 pivots causing the fighting drag electrical contact 154 to slide on the fighting drag resistance strip 164 resulting in a proportionally greater braking force applied by the fighting drag brake 40a. When the line tension reaches a predetermined maximum (below the maximum test strength of the line), the control circuit 142 reduces the braking force automatically, so that the line will never snap. In the drawings, FIG. 14(a) shows the position of the various components of the tension sensor 144 when the line tension is a minimum. FIG. 14(b) shows the various components of the tension sensor 144 as the line tension reaches its maximum allowable limit.

FIGS. 15(a)–17(c) show a cranking speed adjustment mechanism that allows the angler to select the mechanical advantage of the crank handle 34, and thus the speed at which the line is retrieved onto the spool 30 and the ease at which the handle can be turned. The advantages of an adjustable cranking speed handle, combined with an electronically variable fighting drag brake 40a gives the angler superior control over the dynamics involved when landing a fish, and are particularly useful when bringing in a large fish on relatively light tackle. Also, since the crank speed can be precisely controlled, the angler can provide subtle variation to the retrieval speed of a lure so that a particular species of fish is properly enticed by a particular speed at which the lure travels through the water.

For example, the same lure can be used to entice both bluefish and striped bass to strike. However, the optimum speed at which the lure is dragged through the water varies depending on the fish species. When fishing for blue fish, it is more advantageous to have a relatively fast lure speed, as opposed to striped bass which tend to strike at a relatively slower moving lure.

Figure 15A:
FIG. 15(a) is an isolated top plan view of an inventive cranking speed handle.
Figure 15B:
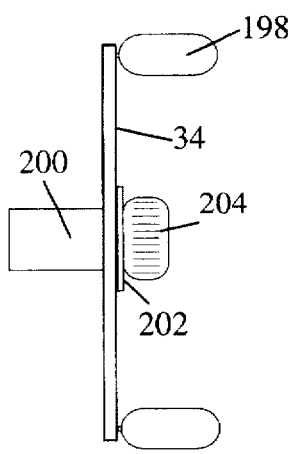
FIG. 15(b) is a side view of the inventive cranking speed handle mounted on a crankshaft.

FIG. 15(a) shows a top plan view of the crank handle 34 in accordance with this aspect of the present invention. The crank handle 34 has a centrally located longitudinally disposed groove 196 and finger grips 198 at either end. As shown in FIG. 15(b), when mounted on the crankshaft 200 of the fishing reel, the crank handle 34 is fixed in position by a clamping force exerted between the crankshaft 200 and a washer 202, in which the clamping force is adjusted by the adjustment knob 204.

Figure 16A:
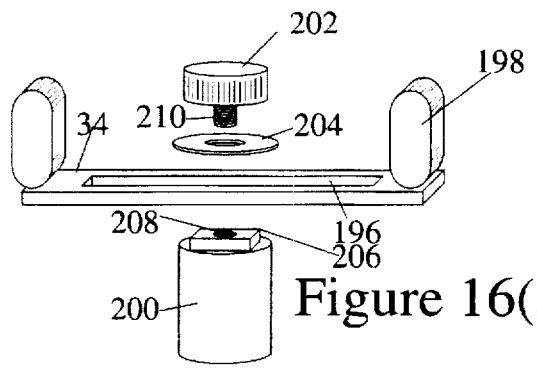
FIG. 16(a) is an exploded perspective view of an inventive cranking speed adjustment mechanism.
Figure 16B:
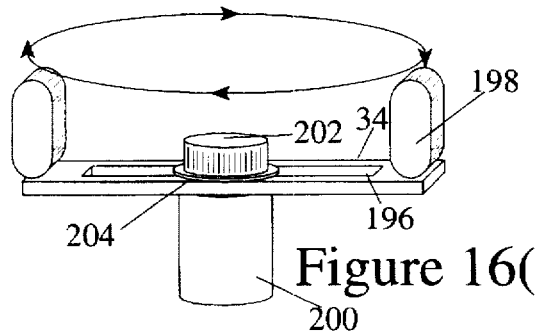
FIG. 16(b) is an assembled perspective view of the inventive cranking speed adjustment mechanism.
Figure 16C:
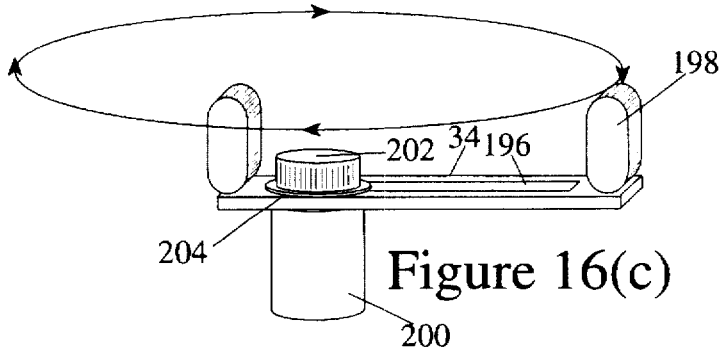
FIG. 16(c) is an assembled perspective view of the inventive cranking speed adjustment mechanism.
Figure 16D:
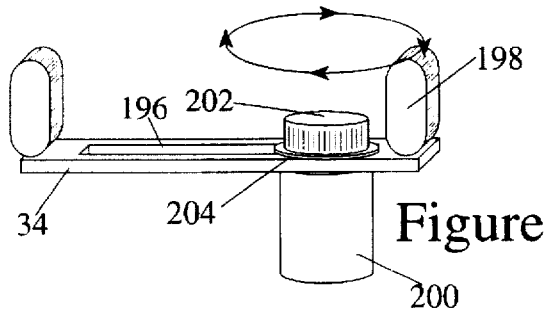
FIG. 16(d) is an assembled perspective view of the inventive cranking speed adjustment mechanism.

FIG. 16(a) is an exploded view of the crank handle 34, friction washer 202, adjustment knob 204 and crankshaft 200. The crankshaft 200 terminates in an engagement structure 206 which mates with the groove 196 in the handle. In this case, the engagement structure 206 is a rectangular box shape structure that slidably fits in the groove 196 of the handle. A threaded hole 208 mates with a threaded post 210 of the adjustment knob 204 to apply the clamping force for holding the handle in place. Thus, as shown in FIG. 16(b) –16(d), the handle may be disposed at a suitable location relative to the crankshaft 200 so that the orbit at which the finger grips 198 move around the crankshaft 200 has a selected diameter. For example, in FIG. 16(b) the finger grips 198 are disposed an equal distance from the center of the crankshaft 200, resulting in an orbit diameter giving a cranking leverage and spool 30 rotation speed that is midpoint in the range of the adjustable handle. FIG. 16(c) shows the case where the finger grip that is used by the angler (the right side finger grip) is at a maximum distance from the center of rotation of the handle, so that the mechanical leverage during cranking is maximum and the speed at which the spool 30 rotates for a given hand crank speed is at its lowest. FIG. 16(d) shows the case where the finger grip is at its closest point to the center of rotation, resulting in the fastest spool 30 rotation for a given hand speed and the weakest mechanical advantage.

FIG. 17(a)–17(c) show the crank handle 34 mounted on the inventive fishing reel, at various adjusted positions. In FIG. 17(a), if the angler is rotating the handle using the lower finger grip, than the crank speed will be slowest, which is suitable during the fight of a large fish or when slowly retrieving the fishing lure. In FIG. 17(b) the finger grips 198 are equidistant from the center of rotation, and this can be considered the average cranking speed of the reel. At FIG. 17(c), the lower finger grip is at its closest position relative to the center of rotation, making the cranking speed for a given hand speed at a maximum, for use during a quick retrieval of the fishing line 32. It is noted that the angler can adjust the speed "on the fly" by merely turning the adjustment knob 204 to loosen the clamping force on the handle and sliding the handle to an appropriate position. Also, the angler can switch between finger grips 198 to go from a relatively fast crank speed to a relatively slow crank speed depending on the fishing conditions.

FIGS. 18(a)–18(c) schematically show another alternative embodiment of the inventive tension sensor 144. In accordance with this embodiment, the inventive tension sensor 144 includes an arm 212 pivotally fixed to the frame of the inventive bait casting fishing reel. One end of the arm 212 terminates in a roller 214, underwhich passes the fishing line 32 that is wound on the spool 30. As the fishing line 32 is played out from or retrieved back onto the spool 30, tension on the line 32 urges the roller 214 causing the arm 212 to pivot relative to the frame 216 of the inventive bait casting fishing reel. As the arm 212 pivots due to the urging force applied by the tension on the fishing line 32, an arm restraining spring 218 supplies a small restoring force urging the arm 212 in a direction opposite the direction of urging from the tension on the fishing line 32. During the casting operation, the tension on the line 32 caused by the projected lure is relatively small as compared with the tension on the line 32 during the fight of a fish. The arm restraining spring 218 has a small spring constant that can be overcome by the tension of the line 32 that exist during a casting operation. The tension of the line 32 during the cast depends on the weight of the lure being cast, the force by which the angler whips the fishing pole, wind conditions, etc. The tension will usually vary through-out the time between when the cast begins and when the cast ends. At the end of the arm 212 opposite the roller 214, an electrical contact 220 is disposed slidably touching a casting resistance strip 222. The arm 212 is pivotally mounted to the frame 216 so that a relatively small deflection of the roller 214 caused by the varying line tension will be translated into a large movement of the contact 220 sliding over the casting resistance strip 222.

A roller retaining spring 224 is disposed having one end fixed to the frame 216 and the other end fixed to a post member 226. The post member 226 is held by a support 228 with a gap provided between the post member 226 and the arm 212. The gap distance is provided so that during the casting operation, the roller retaining spring 224 does not exert any force against the movement of the arm 212 caused by the varying line tension. However, once the line tension exceeds a fighting drag threshold minimum (such as during the fight of a fish), the roller 214 is deflected to a point where the arm 212 makes contact with and lifts the post member 226 off the support 228. The roller retaining spring 224 is stretched as the post member 226 is lifted, exerting a restoring force on the arm 212 against the line tension.

As shown in FIG. 18(a), when the line tension is a minimum (such as during an overrun condition), the electrical contact 220 is disposed on the casting resistance strip 222 closest to the terminal end of a casting resistance wire 230. The arm 212 is conductive so that the contact 2 is electrically coupled with a grounding wire 232 connected at the pivot point of the arm 212. A casting drag circuit is thus completed including a positive terminal of a power source 234 (battery, capacitor, etc.), to a positive terminal of a brake 40, to a negative terminal of the brake 40, to the grounding wire 232, to the arm 212, to the contact 220, to the casting resistance strip 222, to the casting resistance wire 230, to a casting resistor element 236 and finally to a negative terminal of the power source 234. The brake 40 shown in FIGS. 18(a)–18(c) consists in this embodiment as a solenoid that drives a brake pad 238 against the flange 124 of the spool 30, although any of the other brakes described herein may be substituted. When the tension on the line 32 is at a minimum (such as during an overrun condition), there is little or no casting resistance strip 222 electrically separating the contact 2 from the casting resistance wire 230. Thus, when there is an overrun condition the brake 40 receives a maximum power (available from the casting drag circuit) and exerts a maximum casting drag braking force against the rotation of the spool 30. As the tension in the line 32 increases (due to the forward momentum of the lure pulling the line 32 from the spool 30), the contact 220 is disposed so that more of the casting resistance strip 222 is between it and the casting resistance wire 230. The casting resistance strip 222 reduces the power received by the brake 40 from the circuit so that less braking force is applied. When the line tension is such that contact 220 is off the casting drag resistance strip 222 (as shown in FIG. 18(b)), then the casting drag circuit is open and no braking force is exerted.

A fighting drag circuit consists of the same elements as the casting drag circuit except for a fighting drag resistance strip 240 being substituted for the casting drag resistance strip 222, and a fighting resistance wire 242 being substituted for the casting resistance wire 230. The brake 40 consists of a fighting drag brake 40a that couples the cranking mechanism of the inventive bait casting reel with the rotation of the spool, and the fighting drag circuit also lacks the casting resistor element 236. The fighting drag brake 40a is shown as applying a braking force through the pressing of a brake pad 238 against the flange 124 of the spool (as is done for controlling the spool rotation during casting). The casting resistor element 236 is provided in the casting drag circuit to illustrate that the power received by the brake 40 during the casting operation is reduced, as compared with the power that is received by the brake 40 during the fight of a fish. Since the fighting drag circuit does not include the casting resistor element 236, more power is sent from the power source 234 to the brake 40 when the contact 220 is disposed on the fighting drag resistance strip 240.

As shown in FIG. 18(c), during the fight of a fish the tension in the line 32 causes the roller 214 to be deflected enough for the arm 212 to contact and lift the post member 226 from the support 228. When a maximum line tension is reached, the arm 212 is positioned as shown in FIG. 18(c), and the contact 220 is at the end of the fighting drag resistance strip 240 that is closest to the fight resistance wire. Thus, at this condition a maximum power is received by the brake 40, and a maximum braking force is exerted on the spool 30.

FIGS. 19(a)–19(h) illustrate another embodiment of the inventive casting drag brake 40b. As described above with reference to other embodiments of the casting drag brake 40b, this embodiment of the inventive casting drag brake 40b is also controlled depending on the sensed overrun condition so as to apply a braking force to slow the rotation of the spool 30. This embodiment of the inventive casting drag brake 40b utilizes actuator wires 242 made from a shape memory alloy (SMA). An SMA exploits a shape memory phenomenon which occurs in certain alloys, such as alloys in the nickel-titanium family. An example of an SMA actuator wire is manufactured by Dynalloy, Inc. of Irvine, Calif. and sold under the trademark Flexinol. When heated, the SMA actuator wires 242 contract and can exert considerable pulling force as their length shortens. Upon cooling, the SMA actuator wires 242 relax back to their original length. One way of heating the SMA actuator wires 242 is to pass an electrical current through them. The inventive casting drag brake 40b utilizes the contraction of the SMA actuator wires 242 heated by a controlled current flow to drive friction elements together to electronically control the rotation of the spool 30.

As shown in FIGS. 19(a)–19(e), this embodiment of the inventive casting drag brake 40b includes a cylindrical friction element 244 that passes through a through-hole 246 formed in the frame 216 of the inventive bait casting fishing reel. The cylindrical friction element 244 is fixed to a heat sink head 248. A restoring spring urges the heat sink head 248 so as to prevent contact between the cylindrical friction element 244 and the face of the spool 30. One or more SMA actuator wires 242 have their ends clamped between a pair of clamps 250 and pass over the heat sink head 248. The clamps 250 are fixed to the frame 216 of the inventive bait casting fishing reel. As shown in FIG. 19(c), the heat sink head 248 may have grooves that hold the SMA actuator wires 242 in position. A positive wire lead 252 and a negative wire lead 254 are also clamp to respective clamps 250. When a voltage is applied to the positive wire lead 252 and the negative wire lead 254, current flows through the SMA actuator wires 242, causing them to heat up. The SMA actuator wires 242 contract due to the heating, and exert an urging force against the heat sink head 248.

As shown in FIG. 19(a), when no current is applied to the SMA actuator wires 242, a restoring spring 256 maintains the separation between the cylindrical friction element 244 and the face of the spool 30. However, when current is applied to the SMA actuator wires 242 urge the heat sink head 248 so that contact is made between the cylindrical friction element 244 and the face of the spool 30. This contact controllably slows the rotation of the spool 30 so as to prevent an overrun condition. As soon as the current stops flowing to the SMA actuator wires 242, they begin to cool (facilitated by the heat sink characteristics of the various components) and relax back to their original lengths, allowing the urging force of the restoring spring 256 to again separate the cylindrical friction element 244 from the face of the spool 30.

The SMA actuator wires 242 relax back to their original length upon cooling, and therefore must be cooled as quickly as possible for the fastest response time. The clamps 250 are preferably thermo-conductive and also act as heat sinks, drawing the heat from the heated SMA actuator wires 242 to the metal frame 216 of the inventive fishing reel. The heat sink head 248 provides a large heat sink contact surface area, enabling the heated SMA actuator wires 242 to quickly cool so as to improve the response time of the inventive casting drag brake 40b. The heat sink head 248 is preferably configured and dimensioned so that the SMA actuator wires 242 have the greatest contact with the heat sink components when they are contracted. To further enhance the heat sink effect, cooling fins (not shown) can be disposed at appropriate locations, for example, on the heat sink head 248, clamps 250 and/or frame 216.

As shown in FIGS. 19(d) and 19(e), this embodiment of the inventive casting drag brake 40b includes a cylindrical friction element 244, which may be formed from rubber, leather, polymer, metal, or other suitable material. The heat sink head 248 and the clamps 250 may be formed from a material, such as aluminum, or polymer, and preferably has a high thermal transfer rate to act as efficient heat sink components. The clamps 250 comprise a clamp top 258 having through-holes for receiving screws, and a clamp base 260 having threaded holes for engaging with the screws. The SMA actuator wires 242 are clamped between the clamp top 258 and the clamp base 260 by tightening the screws. To facilitate assembly, the positive wire lead 252 and the negative wire lead 254 may also be clamped by the respective clamps 250. The current supplied to the positive wire lead 252 and the negative wire lead 254 comes from the power source 158 (shown, for example, in FIGS. 11(a) and 11(b)).

As shown in FIGS. 19(f)–19(h), this embodiment of the inventive casting drag brake 40a is fixed to the frame 216 (not shown) so that the cylindrical friction element 244 can be driven to contact the face of the spool 30. A friction enhancing disk (not shown) may be provided on the spool 30 face to enhance the rotation slowing friction generated when the cylindrical friction element 244 is urged toward the face of the spool 30. As shown in FIG. 19(g), when the SMA actuator wires 242 are cool (no current supplied through the positive wire lead 252 and the negative wire lead 254), the cylindrical friction element 244 is disposed so there is a slight gap or very little contact pressure between the cylindrical friction element 244 and the spool face (or friction enhancing disk). As shown in FIG. 19(h), when current flows through and heats up the SMA actuator wires 242, they contract and urge the cylindrical friction element 244 against the spool face (or friction enhancing disk).

The inventive casting drag brake 40b shown in FIGS. 19(a)–19(h) illustrate only one construction the utilizes SMA actuator wires 242 to enable controlled contact between friction elements 244 used to control the rotation of the spool 30. Other constructions may, for example, utilize the SMA actuator wires 242 to drive a lever so as to press a friction brake pad against, for example, the flange 124 or the face of the spool 30.

FIG. 22 is a schematic view of an alternative configuration of the inventive bait casting fishing reel. In this configuration, an SMA actuator wire 242 is used to pivot a lever 262 so as to drive a brake pad 238 against the flange 124 of the spool 30. The SMA actuator wire 242 is held within a groove 264 and upon contraction, comes into contact with the walls of the groove 264. The wall of the groove 264 thus perform a heat sinking function to improve the response time of the SMA actuator wire 242.

FIG. 23(a) is an isolated enlarged side view of an inventive line motion sensor 266. The line motion sensor 266 is utilized for similar purposes as the detecting means 48 and the tension sensor 144 described above. Namely, the line motion sensor 266 provides a sensed reading of the characteristics of the fishing line 32 as it is drawn off the spool 30 during a casting operation and/or during the fight of a fish. The inventive line motion sensor 260 includes a driven wheel 268 which is driven by the fishing line 32 as it is drawn from the spool 30. A pressing wheel 270 may be provided for maintaining the fishing line 32 in contact with the driven wheel 268. One or more sensor units 272 are provided on the driven wheel 268 so that the rotation of the driven wheel 268 due to the motion of the fishing line 32 can be sensed.

FIG. 23(b) is an isolated enlarged side view of the inventive line motion sensor shown in FIG. 23(a) having photo-detecting means. In this case, the sensor units 272 comprise a reflective surface. A light beam emitted from a photo-emitter 274 is reflected by each sensor unit 272 as the driven wheel 268 is rotated by the line 32 being drawn from the spool 30. Each time the light beam is reflected, a photo-detector 276 receives the reflected light and generates a pulse, such as a voltage or current pulse. The detection of this pulse by a pulse detector indicates that the line 32 is being drawn from the spool 30, and an overrun condition is not occurring. If during the casting operation the pulse is not detected, than it is determined that an overrun condition is occurring, and a casting drag brake 40b (as described herein) is controlled to slow the rotation of the spool 30, take up the slack in the line 32, and prevent the entanglement or birds nesting of the line 32 on the spool.

FIG. 23(c) is an isolated enlarged side view of the inventive line motion sensor shown in FIG. 23(a) having photo-detecting means. In this case, the sensor units 272 comprise windows in the driven wheel 268. The light beam emitted by the photo-emitter 274 passes through each window as the driven wheel 268 rotates. Each time the light beam passes through a window, a pulse is generated by the photo-detector 276 to determine whether the line is being drawn from the spool 30, or if an overrun condition is occurring. FIG. 23(d) is an isolated enlarged side view of the inventive line motion sensor shown in FIG. 23(a) having magnetic detecting means. In this case, the sensor units 272 comprise magnetic elements. The motion of the magnetic elements is detected by a magnetic detector 278 so that the movement of the line 32 being drawn from the spool 30 can be determined. The determination of the movement of the line 32 can also be used during fishing to indicate that a fish has taken the bait. In this case, after casting out the baited hook, the line 32 will stop moving once movement of the hook ceases. At a later time, if a fish takes the hook and begins to move away with it, the line 32 will again begin to move. This movement of the line 32 as it is drawn from the spool 30 by the fish can thus be determined. An audible or visual alert can be generated to inform the angler of the line's 32 movement so that he can set the hook in the fish.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A fishing reel, comprising: a spool for holding and releasing a length of fishing line; determining means for determining an overrun condition of the fishing line being released from the spool, the determining means comprising electronic switching means having an actuator activatable depending on a tension of the fishing line for generating a tension signal dependent thereon; and an electronically variable brake controlled depending on the tension signal and couplable with the spool for applying a variable braking force to resist rotation of the spool in response to the determined overrun condition of the fishing line being released from the spool.

2. A fishing reel according to claim 1; wherein the electronically variable brake comprises one of an electrical rheological brake, a magneto-rheological brake, a magnetic particle brake, an electric motor, an electric generator, a piezo-electric motor and an ultrasonic motor.

3. A fishing reel according to claim 1; wherein the electronically variable brake comprises a rotatable friction surface coupled with the spool for rotation by the spool, a stationary friction surface and electronically controlled urging means for urging either of the stationary friction surface and the rotatable friction surface in an urging direction effective to vary a contact pressure between the stationary friction surface and the rotatable friction surface.

4. A fishing reel according to claim 3; wherein the electronically controlled urging means comprises an electromagnet.

5. A fishing reel according to claim 3; wherein the electronically variable brake further comprises a spring member for biasing at least one of the rotatable friction surface and the stationary friction surface against the urging direction.

6. A fishing reel according to claim 1; further comprising a housing member; and wherein the electronically variable brake comprises one of a rotor and a stator of an electric motor rotatable by the spool relative to an other of the stator and the rotor fixed to the housing member.

7. A fishing reel according to claim 6; further comprising electrical energy storing means contained within the housing for storing electrical energy generated during rotation of the rotor relative to the stator.

8. A fishing reel according to claim 1; further comprising controlling means for controlling the electronically variable brake to apply a variable braking force to resist rotation of the spool during casting so that a greater braking force is applied when the tension on the line is relatively small and less braking force is applied when the tension on the line is relatively large to prevent the spool from overrunning the length of fishing line being released from the spool during casting.

9. A fishing reel according to claim 1; further comprising controlling means for controlling the electronically variable brake to prevent the spool from overrunning during casting by controlling the electronically variable brake to apply the variable braking force at predetermined times and at predetermined strengths during a release of the fishing line.

10. A fishing reel according to claim 1; wherein the electronically variable brake comprises a first friction element rotatable with the spool and a second friction element held stationary relative to the rotation of the spool, and a shape memory alloy member for driving the first friction element into contact with the second friction element in response to the sensed overrun condition of the fishing line being released from the spool.

11. A fishing reel, comprising: a spool for holding and releasing a length of fishing line; an electronically variable brake couplable with the spool for applying a braking force to resist rotation of the spool during casting to prevent the spool from overrunning the length of fishing line being released from the spool; determining means for determining an overrun status of the length of fishing line being released from the spool and generating an electronic status signal dependent thereon; and controlling means receptive of the electronic status signal for controlling the electronically variable brake to apply the braking force to resist rotation of the spool during casting when the determining means determines an overrun status so that a braking force is applied when the overrun status determined by the determining means indicates that the spool is overrunning the length of fishing line being released, the braking force being applied until the overrun status determined by the determining means indicates that the spool is not overrunning the length of fishing line so as to prevent the spool from further overrunning the length of fishing line being released.

12. A fishing reel according to claim 11; wherein the controlling means includes overrun preventing means for preventing the spool from overrunning during casting by controlling the electronically variable brake to apply the braking force at predetermined times and at predetermined strengths during a release of the fishing line.

13. A fishing reel according to claim 11; wherein the determining means comprises position detecting means for detecting a position of strands of the line held on the spool relative to the spool to determine the overrun status, at least some of the strands being held relatively tightly against the spool when there is no overrun condition and being held relatively loosely against the spool when there is an overrun condition, the overrun status being determined depending on the overrun condition and the electronic status signal being generated depending on the overrun status so that the electronically variable brake applies the braking force to resist rotation of the spool during casting so that a greater braking force is applied when the position of the strands indicates that the line held on the spool is wrapped relatively loose on the spool and less braking force is applied when the position of the line indicates that the line held on the spool is wrapped relatively tight on the spool to prevent the spool from further overrunning the length of fishing line being released from the spool during casting.

14. A fishing reel according to claim 11; further comprising sensing means for sensing comprising electronic switching means having an actuator activatable depending on a tension on a fishing line being released from the spool and generating a tension signal dependent thereon; and controlling means receptive of the tension signal for controlling the electronically variable brake in response thereto.

15. A fishing reel according to claim 14; wherein the controlling means includes overrun preventing means for controlling the electronically variable brake to apply a braking force to resist rotation of the spool during casting so that greater braking force is applied when the tension on the line is relatively small and less braking force is applied when the tension on the line is relatively large to prevent the spool from overrunning the length of fishing line being released from the spool during casting.

16. A fishing reel according to claim 11; wherein the electronically variable brake comprises a first friction element rotatable with the spool and a second friction element held stationary relative to the rotation of the spool, and a shape memory alloy member for driving the first friction element into contact with the second friction element in response to the determined overrun status of the fishing line being released from the spool.

17. A fishing reel according to claim 11; wherein the electronically variable brake comprises one of an electrical rheological brake, a magneto-rheological brake, a magnetic particle brake, an electric motor, an electric generator, a piezo-electric motor and an ultrasonic motor.

18. A fishing reel, comprising: a spool for holding and releasing a length of fishing line; position detecting means for detecting a position of strands of the length line held on the spool relative to the spool to sense an overrun condition of the line being released from the spool, at least some of the strands being held relatively tightly against the spool when there is no overrun condition and being held relatively loosely against the spool when there is an overrun condition; an electronically variable brake couplable with the spool for applying a variable braking force to resist rotation of the spool in response to the sensed overrun condition of the fishing line being released from the spool; and controlling means for controlling the electronically variable brake to apply a variable braking force to resist rotation of the spool during casting so that a greater braking force is applied when the position of the strands indicates that a portion of the line held on the spool is wrapped relatively loose on the spool and less braking force is applied when the position of the line indicates that the line held on the spool is wrapped relatively tight on the spool to prevent the spool from overrunning the length of fishing line being released from the spool.

19. A fishing reel according to claim 18; wherein the electronically variable brake comprises one of an electrical rheological brake, a magneto-rheological brake, a magnetic particle brake, an electric motor, an electric generator, a piezo-electric motor and an ultrasonic motor.

20. A fishing reel according to claim 18; wherein the electronically variable brake comprises a first friction element rotatable with the spool and a second friction element held stationary relative to the rotation of the spool, and a shape memory alloy member for driving the first friction element into contact with the second friction element in response to the sensed overrun condition of the fishing line being released from the spool.

* * * * *